(12) United States Patent
Park et al.

(10) Patent No.: US 11,360,287 B2
(45) Date of Patent: Jun. 14, 2022

(54) LENS MOVING APPARATUS CAPABLE OF SUPPRESSING DEFOCUSING OF A LENS AND CAMERA MODULE AND OPTICAL DEVICE COMPRISING THE SAME

(71) Applicant: LG INNOTEK CO., LTD., Seoul (KR)

(72) Inventors: Sang Ok Park, Seoul (KR); Sang Jun Min, Seoul (KR); Kyoung Ho Yoo, Seoul (KR); Hyune O Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 142 days.

(21) Appl. No.: 16/925,040

(22) Filed: Jul. 9, 2020

(65) Prior Publication Data

US 2020/0341234 A1 Oct. 29, 2020

Related U.S. Application Data

(63) Continuation of application No. 15/750,729, filed as application No. PCT/KR2016/008084 on Jul. 25, 2016, now Pat. No. 10,746,955.

(30) Foreign Application Priority Data

Aug. 6, 2015 (KR) .......................... 10-2015-0110964

(51) Int. Cl.
*G02B 27/64* (2006.01)
*G02B 7/09* (2021.01)
(Continued)

(52) U.S. Cl.
CPC ................. *G02B 7/09* (2013.01); *G02B 7/02* (2013.01); *G02B 7/08* (2013.01); *G02B 27/646* (2013.01);
(Continued)

(58) Field of Classification Search
CPC .. G02B 27/64; G02B 27/646; H04N 5/23248; H04N 5/23264; H04N 5/2328; H04N 5/23287
(Continued)

(56) References Cited

U.S. PATENT DOCUMENTS

2005/0177479 A1 8/2005 Wei
2006/0045504 A1 3/2006 Zarnowski et al.
(Continued)

FOREIGN PATENT DOCUMENTS

CN 1193121 A 9/1998
CN 102206621 A 10/2011
(Continued)

OTHER PUBLICATIONS

International Search Report in International Application No. PCT/KR2016/008084, filed Jul. 25, 2016.
(Continued)

*Primary Examiner* — Arnel C Lavarias
(74) *Attorney, Agent, or Firm* — Saliwanchik, Lloyd & Eisenschenk

(57) ABSTRACT

An embodiment includes: a housing including an upper surface, a lower surface, an inner surface, and an outer surface located at the side opposite to the inner surface; a bobbin accommodated in the housing; a first coil disposed at an outer surface of the bobbin; a first magnet disposed at the outer surface of the housing; a second magnet disposed in the housing so as to be spaced apart from the first magnet; and a first position sensor disposed at the outer surface of the bobbin, wherein a first part of the housing is positioned between the second magnet and the inner surface of the housing.

20 Claims, 23 Drawing Sheets

(51) Int. Cl.
- G02B 7/02 (2021.01)
- G02B 7/08 (2021.01)
- G03B 3/10 (2021.01)
- G03B 5/00 (2021.01)
- G03B 13/36 (2021.01)
- H02K 41/035 (2006.01)
- G02B 13/00 (2006.01)

(52) U.S. Cl.
CPC ............ G03B 3/10 (2013.01); G03B 5/00 (2013.01); G03B 13/36 (2013.01); H02K 41/0356 (2013.01); G02B 7/028 (2013.01); G02B 13/001 (2013.01); G03B 2205/00 (2013.01); G03B 2205/0007 (2013.01); G03B 2205/0069 (2013.01)

(58) Field of Classification Search
USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

| | | | |
|---|---|---|---|
| 2014/0177056 A1 | 6/2014 | Hayashi et al. | |
| 2015/0331251 A1 | 11/2015 | Hu et al. | |
| 2016/0070270 A1* | 3/2016 | Beard | H04N 5/23287 318/647 |
| 2018/0210163 A1* | 7/2018 | Jung | G02B 7/08 |
| 2019/0208128 A1 | 7/2019 | Park et al. | |
| 2019/0265506 A1 | 8/2019 | Park et al. | |

FOREIGN PATENT DOCUMENTS

| | | |
|---|---|---|
| CN | 204009314 U | 12/2014 |
| JP | H10-260445 A | 9/1998 |
| JP | 2013-044924 A | 3/2013 |
| KR | 10-2010-0108259 A | 10/2010 |
| KR | 10-1079026 B1 | 11/2011 |
| KR | 10-2012-0045333 A | 5/2012 |
| KR | 10-2012-0133161 A | 12/2012 |
| KR | 10-2013-0060535 A | 6/2013 |
| KR | 10-2015-0042681 A | 4/2015 |

OTHER PUBLICATIONS

Office Action dated Dec. 24, 2019 in Chinese Application No. 201680055365.1.
Restriction Requirement dated Aug. 2, 2019 in U.S. Appl. No. 15/750,729.
Office Action dated Oct. 9, 2019 in U.S. Appl. No. 15/750,729.
Office Action dated Jan. 30, 2020 in U.S. Appl. No. 15/750,729.
Notice of Allowance dated Apr. 10, 2020 in U.S. Appl. No. 15/750,729.
Office Action dated Mar. 15, 2022 in Korean Application No. 10-2015-0110964.

* cited by examiner

LENS MOVING APPARATUS CAPABLE OF SUPPRESSING DEFOCUSING OF A LENS AND CAMERA MODULE AND OPTICAL DEVICE COMPRISING THE SAME

CROSS-REFERENCE TO RELATED APPLICATIONS

This application is a continuation of U.S. application Ser. No. 15/750,729, filed Feb. 6, 2018; which is the U.S. national stage application of International Patent Application No. PCT/KR2016/008084, filed Jul. 25, 2016, which claims priority to Korean Application No. 10-2015-0110964, filed Aug. 6, 2015, the disclosures of each of which are incorporated herein by reference in their entirety.

TECHNICAL FIELD

Embodiments relate to a lens moving apparatus and to a camera module and an optical device each including the same.

BACKGROUND ART

Technology of a voice coil motor (VCM), which is used in existing general camera modules, is difficult to apply to a micro-scale, low-power camera module, and studies related thereto have been actively conducted.

In the case of a camera module configured to be mounted in a small electronic product, such as a smart phone, the camera module may frequently receive shocks when in use, and may undergo fine shaking due to, for example, the shaking of a user's hand. In consideration of this fact, there is a demand for the development of technology enabling a device for inhibiting handshake to be additionally installed to a camera module.

DISCLOSURE

Technical Problem

The embodiments provide a lens moving device capable of suppressing defocusing of a lens caused by variation in the ambient temperature and of easily performing calibration for auto-focusing feedback driving.

Technical Solution

A lens moving apparatus according to an embodiment includes a housing including an upper surface, a lower surface, an inner circumferential surface and an outer circumferential surface positioned opposite the inner circumferential surface; a bobbin disposed in the housing; a first coil disposed on an outer circumferential surface of the bobbin; a first magnet disposed on the outer circumferential surface of the housing; a second magnet disposed on the housing so as to be spaced apart from the first magnet; and a first position sensor disposed on the outer circumferential surface of the bobbin, wherein a first portion of the housing is positioned between the second magnet and an inner circumferential surface of the housing.

The housing may be provided at an upper portion thereof with a first magnet seat on which the second magnet is mounted, and the first portion of the housing may be positioned between the second magnet mounted on the first magnet seat and the inner circumferential surface of the housing.

The second magnet mounted on the first magnet seat may be exposed from the outer circumferential surface of the housing.

The second magnet mounted on the first magnet seat may be exposed from the outer circumferential surface and the upper surface of the housing.

A second portion of the housing may be positioned between the second magnet mounted on the first magnet seat and the outer circumferential surface of the housing, and a thickness of the first portion of the housing may be greater than a thickness of the second portion of the housing.

The first magnet seat may be depressed from the outer circumferential surface and the upper surface of the housing.

A third portion of the housing may be positioned between the second magnet mounted on the first magnet seat and the upper surface of the housing, and a thickness of the first portion of the housing may be greater than a thickness of the third portion of the housing.

The second magnet mounted on the first magnet seat may be exposed from the upper surface of the housing.

The lens moving apparatus may further include an adhesive member disposed between the first magnet seat and the second magnet.

As a temperature increases, the first portion of the housing may expand, and a distance between the second magnet and the first position sensor may thus increase.

A lens moving apparatus according to another embodiment includes a housing including a cavity and a plurality of first side portions; a bobbin disposed in the cavity of the housing; a first coil disposed on an outer circumferential surface of the bobbin; a first magnet disposed on the plurality of first side portions of the housing; a second magnet disposed on one of the plurality of first side portions so as to be spaced apart from the first magnet; and a first position sensor disposed on the outer circumferential surface of the bobbin, wherein a cross point between a first graph and a second graph is located in a third quadrant of an x-y coordinates system wherein the first graph is a graph representing an output value of the first position sensor over an intensity of a magnetic field detected by the first position sensor at a first temperature and the second graph is a graph representing an output value of the first position sensor over an intensity of a magnetic field detected by the first position sensor at a second temperature.

The first temperature may be 25° C., and the second temperature may be higher than 25° C. but lower than 65° C.

A range of output of the first position sensor in a stroke range in which the bobbin is movable may be included in a first area, wherein the first area is an area including a value that is equal to or higher than a first reference value, the first reference value being an output of the first position sensor at the cross point.

A range of output of the first position sensor in a stroke range in which the bobbin is movable may be included in a first area wherein, the first area is an area that is higher than a first reference value, the first reference value being an output of the first position sensor at the cross point.

A range of output of the first position sensor in a stroke range in which the bobbin is movable may be a portion of the first area located in the first quadrant.

An output value of the first position sensor may decrease as a temperature increases.

The cross point may be spaced apart from an origin of the x-y coordinates system and from an x-axis and a y-axis.

A camera module according to an embodiment includes a lens barrel; the lens moving apparatus for moving the lens barrel; and an image sensor for converting an image, which is incident through the lens moving apparatus, into an electrical signal.

An optical device according to an embodiment includes a display module including a plurality of pixels, which are changed in color in response to an electrical signal; the camera module for converting an image, which is incident through a lens, into an electrical signal; and a controller for performing control of motion of the display module and the camera module.

Advantageous Effects

Embodiments are capable of suppressing defocusing of a lens caused by variation in the ambient temperature and of easily performing calibration for auto-focusing feedback driving.

BEST MODE

Figure 1:
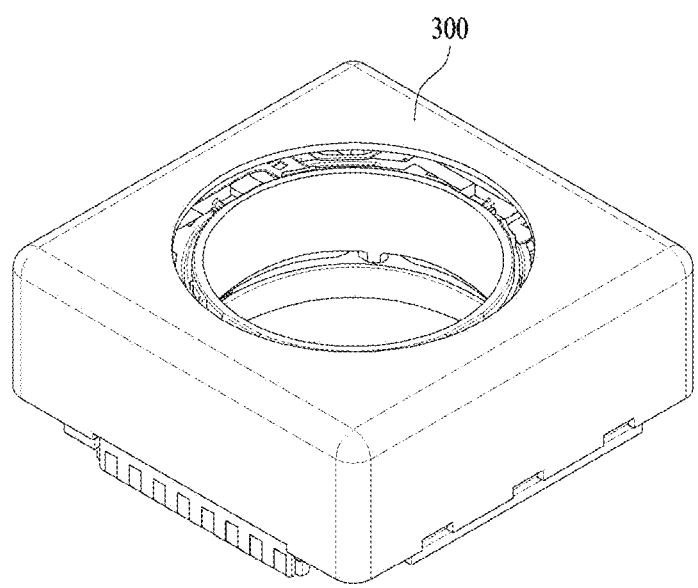
FIG. 1 is a perspective view illustrating a lens moving apparatus according to an embodiment.
Figure 1:
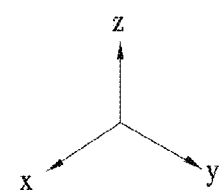

Hereinafter, embodiments will be clearly revealed via description thereof with reference to the accompanying drawings. In the following description of the embodiments, it will be understood that, when an element such as a layer (film), region, pattern, or structure is referred to as being "on" or "under" another element, it can be "directly" on or under another element or can be "indirectly" formed such that an intervening element may also be present. In addition, it will also be understood that the criteria for "on" or "under" are determined on the basis of the drawings.

In the drawings, the dimensions of layers are exaggerated, omitted or illustrated schematically for clarity and convenience of description. In addition, the dimensions of constituent elements do not entirely reflect the actual dimensions. Wherever possible, the same reference numbers will be used throughout the drawings to refer to the same or like parts.

Hereinafter, a lens moving apparatus according to an embodiment will be described with reference to the accompanying drawings. For the convenience of description, although the lens moving apparatus is described using a rectangular coordinate system (x, y, z), the lens moving apparatus may be described using some other coordinate systems, and the embodiment is not limited thereto. In the respective drawings, the X-axis and the Y-axis mean directions perpendicular to an optical axis, i.e. the Z-axis, and the optical axis (Z-axis) direction may be referred to as a "first direction", the X-axis direction may be referred to as a "second direction", and the Y-axis direction may be referred to as a "third direction".

A "handshake correction device", which is applied to a subminiature camera module of a mobile device such as, for example, a smart phone or a tablet PC, may be a device that is configured to inhibit the contour line of a captured image from being indistinctly formed due to vibration caused by shaking of the user's hand when capturing a still image.

In addition, an "auto-focusing device" is a device that automatically focuses an image of a subject on an image sensor surface. The handshake correction device and the auto-focusing device may be configured in various ways, and the lens moving apparatus according to the embodiment may move an optical module, which is constituted of at least one lens, in the first direction, which is parallel to the optical axis, or relative to a plane defined by the second and third directions, which are perpendicular to the first direction, thereby performing handshake correction motion and/or auto-focusing.

Figure 2:
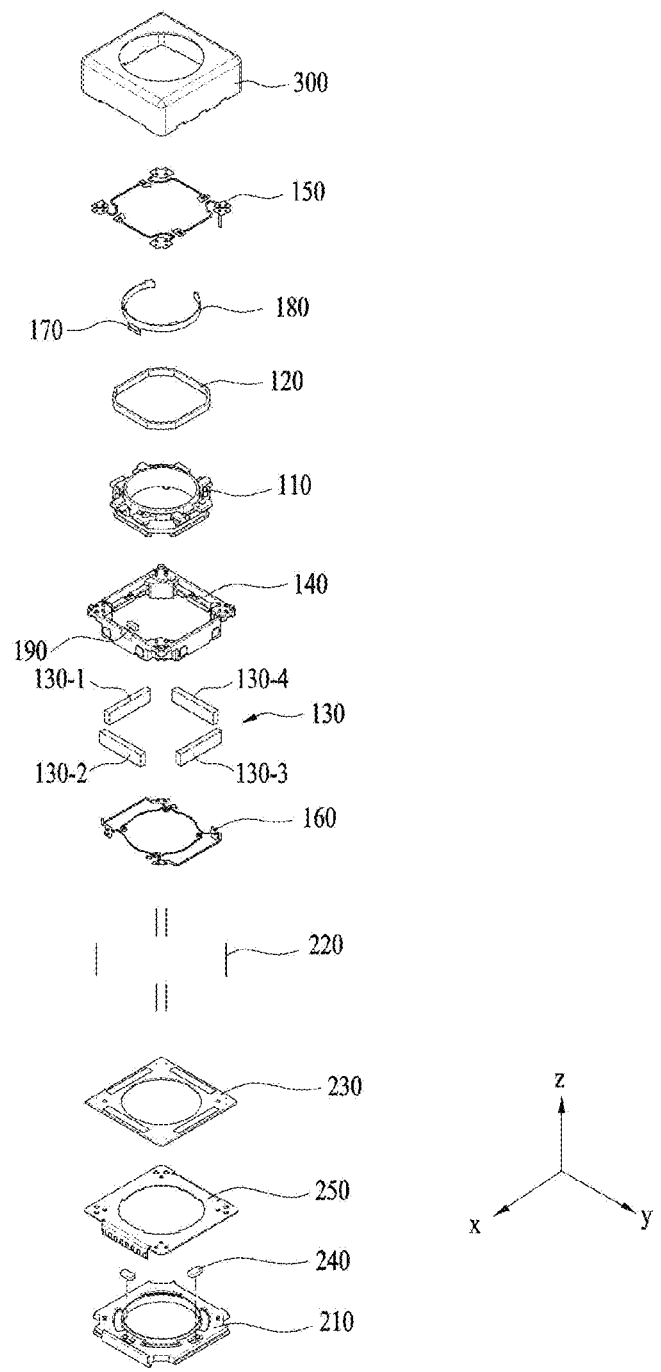
FIG. 2 is an exploded perspective view of the lens moving apparatus illustrated in FIG. 1.

FIG. 1 is a schematic perspective view illustrating the lens moving apparatus according to an embodiment, and FIG. 2 is an exploded perspective view of the lens moving apparatus illustrated in FIG. 1.

Referring to FIGS. 1 and 2, the lens moving apparatus an embodiment may include a cover member 300, an upper elastic member 150, a sensor board 180, a first position sensor 170, a first coil 120, a bobbin 110, a housing 140, a first magnet 130, a second magnet 190, a lower elastic member 160, a plurality of support members 220, a circuit board 250 and a base 210.

The lens moving apparatus according to the embodiment may further include a second coil 230, which interacts with the first magnet 130 for handshake correction.

The lens moving apparatus according to the embodiment may further include a second position sensor 240 for detecting the intensity of a magnetic field of the first magnet 130 for handshake correction.

First, the cover member 300 will be described.

The cover member 300 defines an accommodation space along with the base 210, such that the upper elastic member 150, the bobbin 110, the first coil 120, the housing 140, the second magnet 190, the first magnet 130, the lower elastic member 160, the support members 220, the second coil 230, and the circuit board 250 are accommodated in the accommodation space.

The cover member 300 may take the form of a box, which has an open bottom and includes an upper end portion and sidewalls. The bottom of the cover member 300 may be coupled to the top of the base 210. The upper end portion of the cover member 300 may have a polygonal shape, such as, for example, a square or octagonal shape.

The cover member 300 may have a bore formed in the upper end portion thereof in order to expose a lens (not shown), coupled to the bobbin 110, to outside light. In addition, the bore of the cover member 300 may be provided with a window formed of a light-transmitting material, in order to inhibit impurities, such as, for example, dust or moisture, from entering a camera module.

Although the material of the cover member 300 may be a non-magnetic material such as, for example, SUS in order to inhibit the cover member 300 from being attracted by the first magnet 130, the cover member 300 may be formed of a magnetic material, and may function as a yoke.

Figure 3:
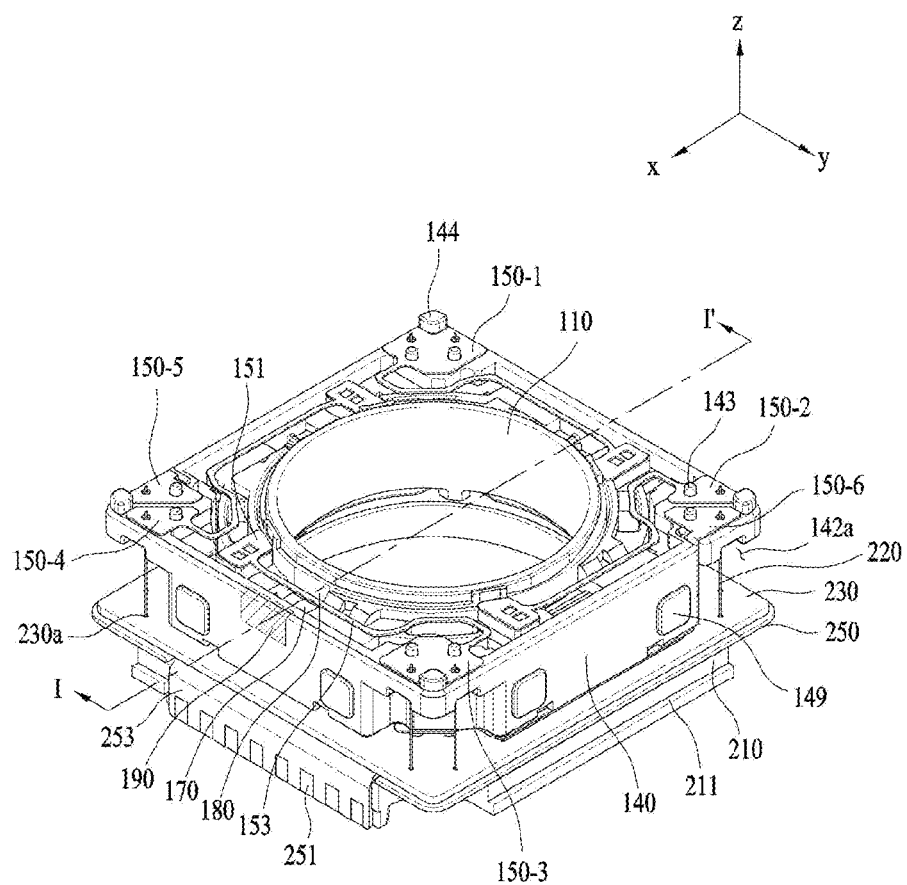
FIG. 3 is an assembled perspective view illustrating the lens moving apparatus shown in FIG. 1, from which a cover member is removed.
Figure 4:
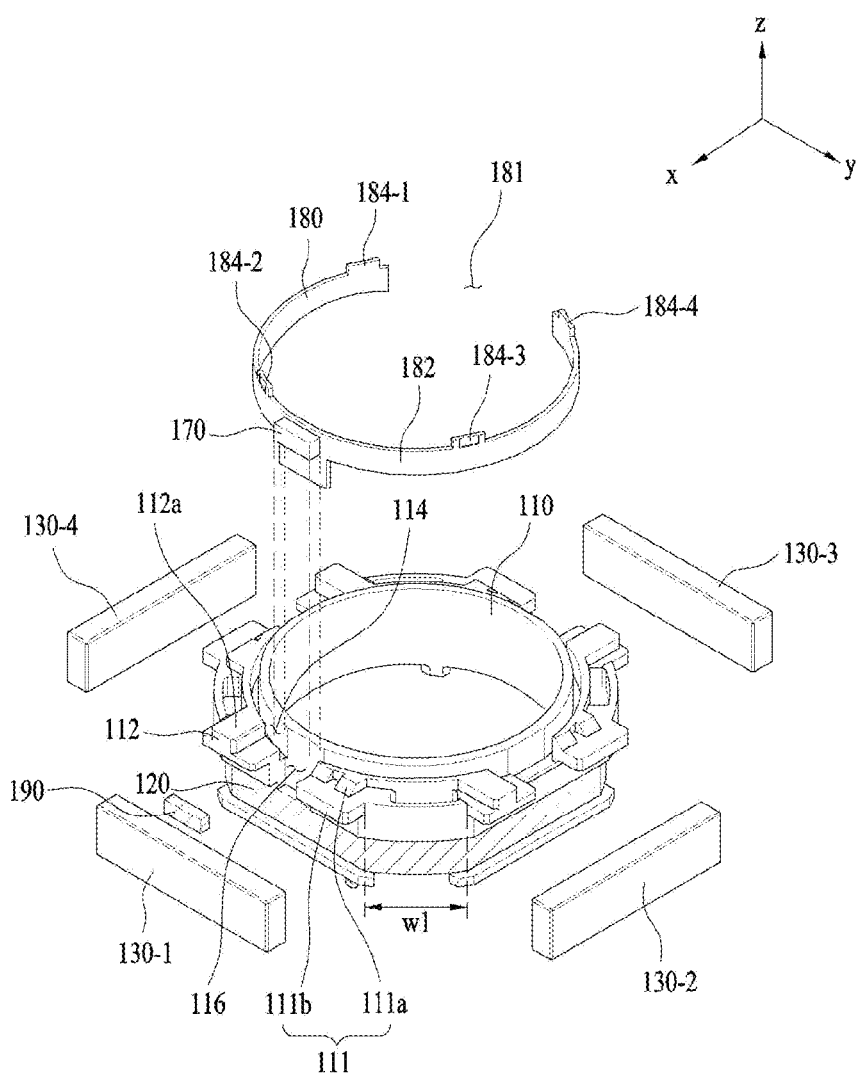
FIG. 4 is an exploded perspective view of a bobbin, a first coil, a first magnet, a second magnet, a first position sensor, and a sensor board, which are illustrated in FIG. 2.

FIG. 3 is an assembled perspective view illustrating the lens moving apparatus after removal of the cover member 300 of FIG. 1, and FIG. 4 is an exploded perspective view of the bobbin 110, the first coil 120, the second magnet 190, the first magnets 130-1 to 130-4, the first position sensor 170, and the sensor board 180 illustrated in FIG. 2.

Next, the bobbin 110 will be described.

Referring to FIGS. 3 and 4, the bobbin 110 is placed inside the housing 140, and is movable in the direction of the optical axis or in the first direction, which is parallel to the optical axis, for example, in the Z-axis direction, via electromagnetic interaction between the first coil 120 and the first magnet 130.

Although a lens may be directly mounted on the bobbin, the disclosure is not limited thereto.

Although not illustrated, the bobbin 110 may include a lens barrel (not shown) in which at least one lens is installed. The lens barrel may be coupled inside the bobbin 110 in various manners.

The bobbin 110 may be configured to have a bore for mounting the lens or the lens barrel. The bore may have a circular, elliptical, or polygonal shape, without being limited thereto.

The bobbin 110 may include first and second protrusions 111 and 112.

The first protrusion 111 of the bobbin 110 may include a guide portion 111a and a first stopper 111b.

The guide portion 111a of the bobbin 110 may serve to guide the position at which the upper elastic member 150 is installed. For example, as exemplarily illustrated in FIG. 3, the guide portion 111a of the bobbin 110 may guide the path along which a first frame connector 153 of the upper elastic member 150 extends.

For example, a plurality of guide portions 111a may protrude in the second and third directions, which are perpendicular to the first direction. In addition, the guide portions 111a may be arranged in a pattern symmetric with respect to the center of the plane defined by the x-axis and the y-axis, as illustrated in the drawings, or may be arranged in a pattern asymmetric with respect to the center without interference with other components, unlike the embodiment illustrated in the drawings.

The second protrusion 112 of the bobbin 110 may be formed so as to protrude in the second and third directions, which are perpendicular to the first direction. In addition, the second protrusion 112 of the bobbin 110 may have an upper surface 112a having a shape on which the first inner frame 151 is mounted.

The first stopper 111b of the first protrusion 111 of the bobbin 110 and the second protrusion 112 of the bobbin 110 may serve to inhibit the bottom surface of the body of the bobbin 110 from directly colliding with the base 210 and the upper surface of the circuit board 250 even if the bobbin 110 moves beyond a prescribed range due to, for example, external shocks, when being moved in the first direction parallel to the optical axis and a direction parallel to the first direction for auto-focusing.

The bobbin 110 may have a support groove 114 provided between the inner circumferential surface 110a and the outer circumferential surface of the bobbin 110 so as to allow the sensor board 180 to be inserted into the bobbin 110 in the first direction. For example, the support groove 114 in the bobbin 110 may be provided between the inner circumferential surface 110a of the bobbin 110 and the first and second protrusions 111 and 112 so as to enable the insertion of the sensor board 180 in the first direction. Furthermore, the support groove 114 of the bobbin 110 may be configured to have the shape of a ring defined between the inner circumferential surface 110a and the outer circumferential surface of the bobbin 110.

The bobbin 110 may have a receiving recess 116, in which the first position sensor 170, which is disposed, coupled, or mounted on the sensor board 180, is received or disposed.

For example, the receiving recess 116 of the bobbin 110 may be provided in the space between the first and second protrusions 111 and 112 of the bobbin 110, so as to allow the first position sensor 170, mounted on the sensor board 180, to be inserted in the first direction.

The bobbin 110 may have a support protrusion 117 (see FIG. 8) formed on the lower surface thereof so as to be coupled and fixed to the lower elastic member 160.

When the state in which the lower surfaces of the first and second protrusions 111 and 112 of the bobbin 110 are in contact with the bottom surface 146a of a first mounting groove 146 is set to be an initial position, the auto-focusing function may be controlled as in unidirectional control in an existing voice coil motor (VCM). Specifically, the bobbin 100 may be raised when current is supplied to the first coil 120, and may be lowered when the supply of current to the first coil 120 is cut off, thereby performing the auto-focusing function.

However, when the position at which the lower surfaces of the first and second protrusions 111 and 112 of the bobbin 110 are spaced apart from the bottom surface 146a of the first seating groove 146 by a predetermined distance is set to be the initial position of the bobbin 110, the auto-focusing function may be controlled depending on the direction of current, as in bidirectional control in an existing voice coil motor. Specifically, the auto-focusing function may also be fulfilled by moving the bobbin 110 in an upward or downward direction parallel to the optical axis. For example, the bobbin 110 may be moved upwards when forward current is applied, and may be moved downwards when reverse current is applied.

Next, the first coil 120 will be described.

The first coil 120 is disposed on the outer circumferential surface of the bobbin 110. The first coil 120 may be located so as not to overlap the first position sensor 170 in the second or third direction which is perpendicular to the first direction.

In order to ensure that the first coil 120 and the first position sensor 170 do not interfere or overlap each other in the second or third direction, the first coil 120 and the first position sensor 170 may be located on the outer circumferential surface of the bobbin 110 so as to be spaced apart from each other. For example, the first coil 120 may be located on the lower side or the lower portion of the outer circumferential surface of the bobbin 110, and the first position sensor 170 may be located on the upper side of the first coil 120.

The first coil 120, as exemplarily illustrated in FIG. 4, may be wound so as to surround the outer circumferential surface of the bobbin 110 in the direction in which the first coil 120 rotates about the optical axis.

Figure 8:
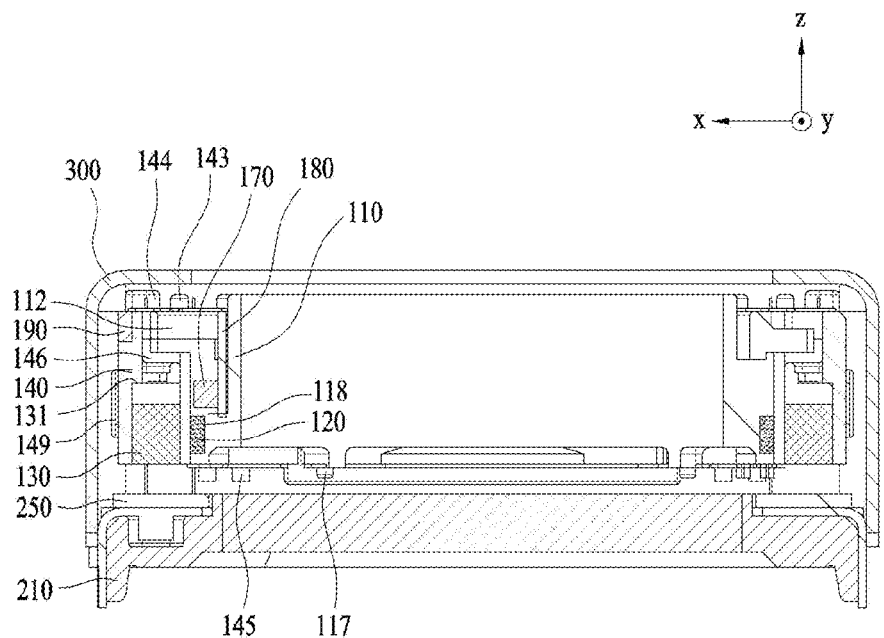
FIG. 8 is a sectional view taken along line I-I' in FIG. 3.

As exemplarily illustrated in FIG. 8, the first coil 120 may be fitted, disposed or secured in a groove 118 formed in the outer circumferential surface of the bobbin 110.

In FIG. 4, although the first coil 120 may be situated directly on the outer circumferential surface of the bobbin 110, the disclosure is not limited thereto. In another example, the first coil 120 may be wound around the bobbin 110 via a coil ring, or may be configured to have the form of an angled ring-shaped coil block. In this case, the coil ring may be coupled to the bobbin 110 in the same manner as the manner in which the sensor board 180 is fitted into the support groove 114 in the bobbin 110.

Figure 5A:
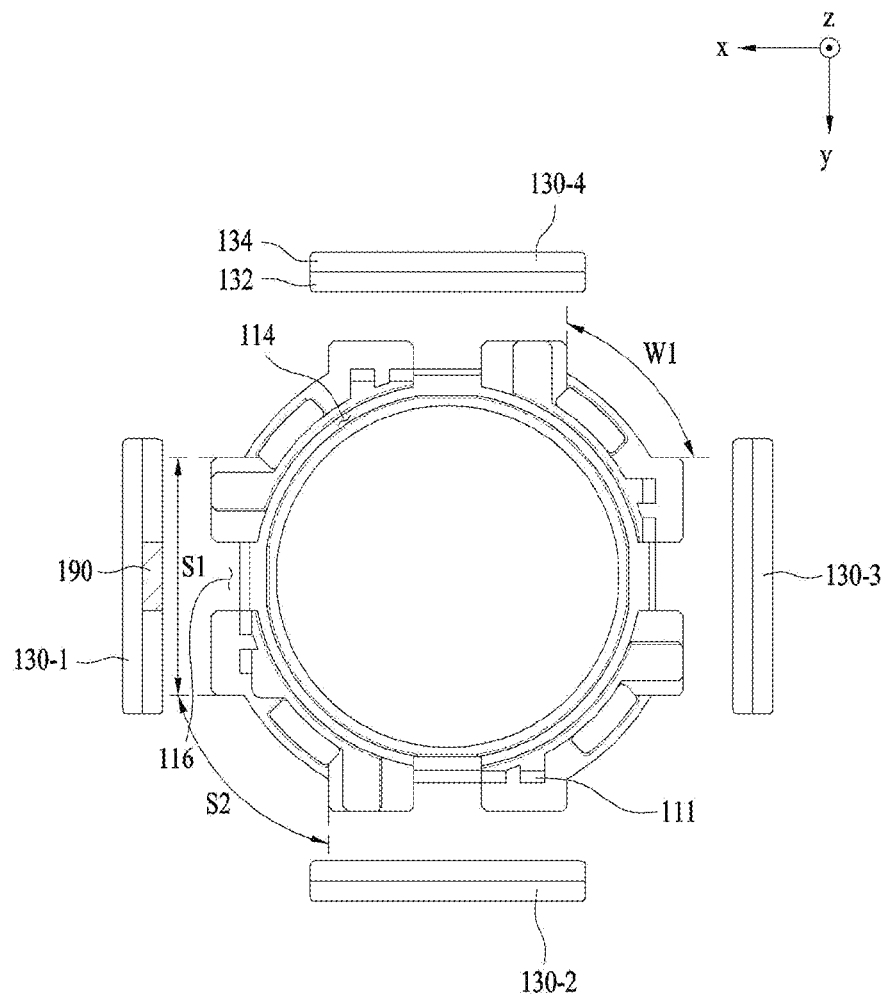
FIG. 5A is a plan view illustrating the bobbin and the second magnet, which are illustrated in FIG. 4.

As illustrated in FIG. 2, the first coil 120 may be configured to have an octagonal shape. The reason for this is because the shape of the first coil 120 is configured to correspond to the shape of the outer circumferential surface of the bobbin 110, which is octagonal, as illustrated in FIG. 5A.

At least four sides of the first coil 120 may be configured to have a linear shape, and the corner portions between the four sides may also be configured to have a linear shape. However, they may also be configured to have a round shape.

The first coil 120 may produce electromagnetic force via electromagnetic interaction between the first coil 120 and the magnet 130 when current is supplied thereto, thereby moving the bobbin 110 in the first direction or a direction parallel to the first direction using the electromagnetic force.

The first coil 120 may be configured to correspond to the first magnet 130. When the first magnet 130 is constituted by a single body such that the surface of the first magnet 130 that faces the first coil 120 has the same polarity, the surface of the first coil 120 that faces the first magnet 130 may also be configured to have the same polarity.

If the first magnet 130 is divided into two or four segments by a plane, which is perpendicular to the optical axis, such that the surface of the magnet 130 that faces the first coil 120 is correspondingly sectioned into two or more surfaces, the first coil 120 may also be divided into a number of coil segments that corresponds to the number of first magnet segments.

Next, the first position sensor 170 and the sensor board 180 will be described.

The first position sensor 170 may be disposed, coupled, or mounted on the bobbin 110 so as to move along with the bobbin 110.

The first position sensor 170 may move along with the bobbin 110 when the bobbin 110 moves in the first direction. The first position sensor 170 may detect the sum of the strength of the magnetic field of the second magnet 190 and the strength of the magnetic field of the first magnet 130 depending on the movement of the bobbin 110, and may form an output signal based on the detected result. The displacement in the optical axis direction of the bobbin 110 or the first direction may be controlled using the output signal from the first position sensor 170.

The first position sensor 170 may be conductively connected to the sensor board 180. The first position sensor 170 may take the form of a driver that includes a Hall sensor, or may take the form of a position detection sensor alone such as, for example, a Hall sensor.

The first position sensor 170 may be disposed, coupled, or mounted on the bobbin 110 in various forms, and may receive current in various ways depending on the manner in which the first position sensor 170 is disposed, coupled, or mounted.

The first position sensor 170 may be disposed, coupled, or mounted on the outer circumferential surface of the bobbin 110.

For example, the first position sensor 170 may be disposed, coupled, or mounted on the sensor board 180, and the sensor board 180 may be disposed or coupled to the outer circumference surface of the bobbin 110. In other words, the first position sensor 170 may be indirectly disposed, coupled or mounted on the bobbin 110 via the sensor board 180.

The first position sensor 170 may be conductively connected to at least one of the upper elastic member 150 and the lower elastic member 160. For example, the first position sensor 170 may be conductively connected to the upper elastic member 150.

Figure 5B:
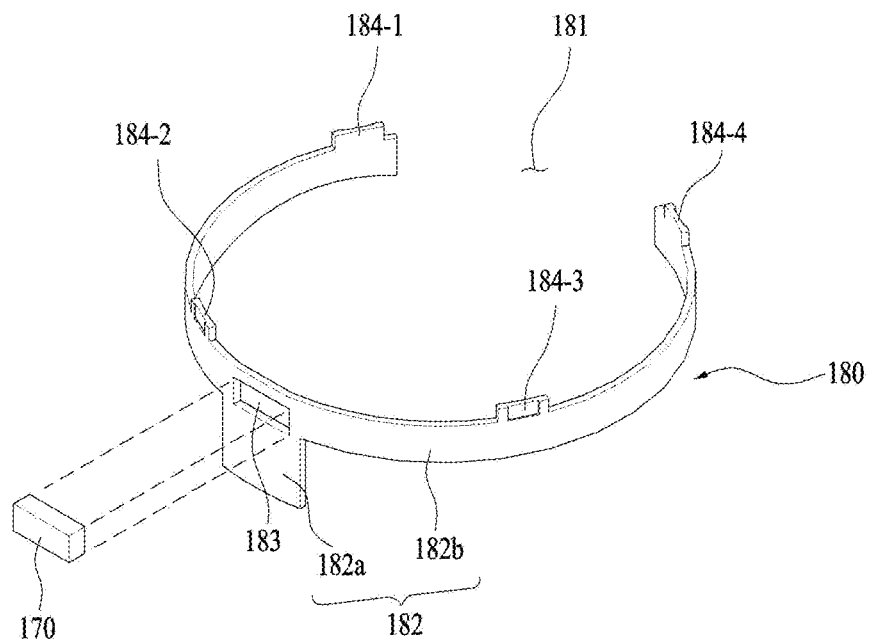
FIG. 5B is an exploded perspective view illustrating the sensor board and the first position sensor, which are illustrated in FIG. 4.
Figure 5C:
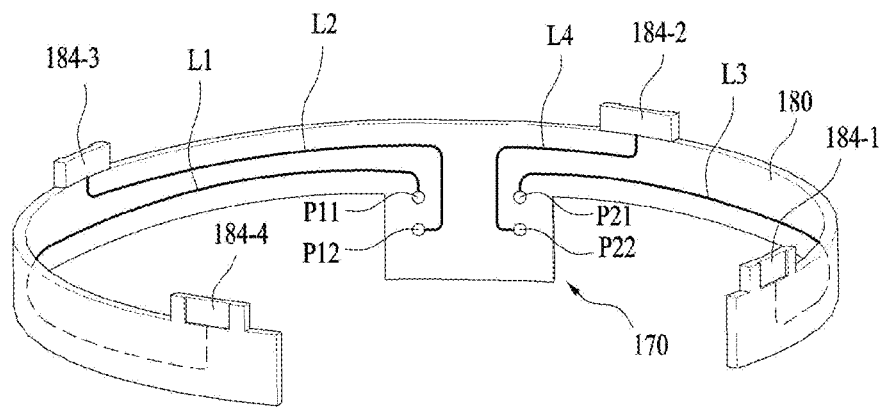
FIG. 5C is a rear perspective view illustrating an embodiment of the sensor board illustrated in FIG. 4.

FIG. 5A is a plan view illustrating the bobbin 110 and the first magnet 130 (130-1, 130-2, 130-3 and 130-4), which are illustrated in FIG. 4. FIG. 5B is an exploded perspective view illustrating the sensor board 180 and the first position sensor 170, which are illustrated in FIG. 4. FIG. 5C is a rear perspective view illustrating the sensor board 180 according to an embodiment, which is illustrated in FIG. 4.

Referring to FIGS. 4 and 5A, the sensor board 180 may be mounted on the bobbin 110, and may move along with the bobbin 110 in the optical axis direction or in a direction parallel to the optical axis.

For example, the sensor board 180 may be coupled to the bobbin 110 by being fitted or disposed in the support groove 114 in the bobbin 110. The sensor board 180 is sufficient so long as it is mounted on the bobbin 110. Although FIG. 4 illustrates a sensor board 180 having a ring shape, the disclosure is not limited thereto.

The first position sensor 170 may be attached to and supported by the front surface of the sensor board 180 using an adhesive member such as, for example, epoxy or a piece of double-sided tape.

The outer circumferential surface of the bobbin 110 may include first side surfaces S1 and second side surfaces S2. The first side surfaces S1 correspond to first side portions 141 of the housing 140 on which the first magnet 130 is disposed. The second side surfaces S2 are located between the first side surfaces S1 so as to connect the first side surfaces S1 to one another.

The first position sensor 170 may be disposed on any one of the first side surfaces S1 of the bobbin 110. For example, the recess 116 in the bobbin 110 may be provided in either one of the first side surfaces S1 of the bobbin 110, and the first position sensor 170 may be located in the recess 116 in the bobbin 110.

Referring to FIG. 5B, the first position sensor 170 may be disposed, coupled, or mounted to an upper portion, a middle portion, or a lower portion of the outer circumferential surface of the sensor board 180 in various forms.

For example, the first position sensor 170 may be disposed on any one of the upper portion, the middle portion and the lower portion of the outer circumferential surface of the sensor board 180 so as to be disposed or directed in the first direction in the space between the first and second magnets 190 and 130 at the initial position of the bobbin 110. The first position sensor 170 may receive current from outside through a circuit of the sensor board 180.

The first position sensor 170 may be disposed, coupled or mounted on the upper portion of the outer circumferential surface of the sensor board 180 so as to be positioned or arranged in the space between the first and second magnets 190 and 130 in the first direction from the initial position of the bobbin 110.

The first position sensor 170 may be disposed on the upper portion A1 of the outer circumferential surface of the sensor board 180 so as to be positioned as far from the first coil 120 as possible such that the first position sensor 170 is not influenced by the magnetic field generated by the first coil 120, thereby inhibiting malfunctions or errors of the first position sensor 170.

As illustrated in FIG. 5B, for example, the sensor board 180 may have a mounting recess 183 formed in the upper portion of the outer circumferential surface thereof, and the first position sensor 170 may be disposed, coupled or mounted in the mounting recess 183 in the sensor board 180.

In order to allow more efficient injection of epoxy or the like for assembly of the first position sensor 170, at least one surface of the mounting recess 183 of the sensor board 180 may be provided with an inclined surface (not shown). Although additional epoxy or the like may not be injected into the mounting recess 183 in the sensor board 180, it may be possible to increase the force with which the first position sensor 170 is disposed, coupled or mounted by injecting epoxy or the like into the mounting recess 183.

The sensor board 180 may include a body 182, elastic member contact portions 184-1 to 184-4, and a circuit pattern L1-L4.

When the support groove 114 in the bobbin 110 has the same shape as that of the outer circumferential surface of the bobbin 1100, the body 182 of the sensor board 180, which is fitted into the support groove 114 of the bobbin 110, may have a shape which is capable of being fitted into the groove 114 and being secured thereto.

Although the support groove 114 in the bobbin 110 and the body 182 of the sensor board 180 may have a circular shape when viewed in a plan view, as illustrated in FIGS. 3 to 5A, the disclosure is not limited thereto. In another embodiment, the support groove 114 in the bobbin 110 and the body 182 of the sensor board 180 may have a polygonal shape when viewed in a plan view.

Referring to FIG. 5B, the body 182 of the sensor board 180 may include a first segment 182a, on which the first position sensor 170 is disposed, coupled, or mounted, and a second segment 182b, which extends from the first segment 182a and which is fitted into the support groove 114 in the bobbin 110.

Although the sensor board 180 may have an opening 181 in the portion thereof that faces the first segment 182a so as to be easily fitted into the support groove 114 in the bobbin 110, the disclosure is not limited to any specific structure of the sensor board 180.

The elastic member contact portions 184-1 to 184-4 of the sensor board 180 may protrude from the body 182 of the sensor board 180 in, for example, the optical axis direction or the first direction in which the contact portions can come into contact with the first inner frame 151.

The elastic member contact portions 184-1 to 184-4 of the sensor board 180 may be connected to the first inner frame 151 of the upper elastic member 150.

The circuit pattern L1-L4 of the sensor board 180 may be formed on the body 182 of the sensor board 180, and may conductively connect the first position sensor 170 and the elastic member contact portions 184-1 to 184-4 to each other.

The first position sensor 170 may be embodied as a Hall sensor, for example, but may be embodied as any sensor as long as it is able to detect the intensity of a magnetic field. If the first position sensor 170 is embodied as a Hall sensor, the hall sensor may include a plurality of pins.

For example, the plurality of pins may include input pins P11 and P12 and output pins P21 and P22. Signals output through the output pins P21 and P22 may be a current type or a voltage type.

The input pins P11 and P12 and the output pins P21 and P22 of the first position sensor 170 may be conductively connected to the respective elastic member contact portions 184-1 to 184-4 via the circuit pattern L1 to L4.

For example, referring to FIG. 5C, the first line L1 of the circuit pattern may conductively connect the first pin P11 to the fourth elastic member contact portion 184-4, and the second line L2 of the circuit pattern may conductively connect the second input pin P12 to the third elastic member contact portion 184-3. In addition, the third line L3 of the circuit pattern may conductively connect the first output pin P21 to the first elastic member contact portion 184-1, and the fourth line L4 of the circuit pattern may conductively connect the second output pin P22 to the second elastic member contact portion 184-2.

In an embodiment, the first to fourth lines L1 to L4 may be formed so as to be visible to the naked eye. In another embodiment, the first to fourth lines L1 to L4 may be formed in the body 182 of the sensor board 180 so as not to be visible to the naked eye.

Next, the housing 140 will be described.

The housing 140 may support the second magnet 190 for detection and the first magnet 130 for driving, and may accommodate the bobbin 110 therein such that the bobbin 110 is allowed to move in the first direction parallel to the optical axis.

The housing 140 may generally have a hollow column shape. For example, the housing 140 may have a polygonal (e.g., a square or octagonal) or circular bore 201. For example, the housing 140 may include an upper surface, a lower surface, an inner circumferential surface and an outer circumferential surface, and the bobbin 110 may be disposed in the space defined in the housing 140.

Figure 6:
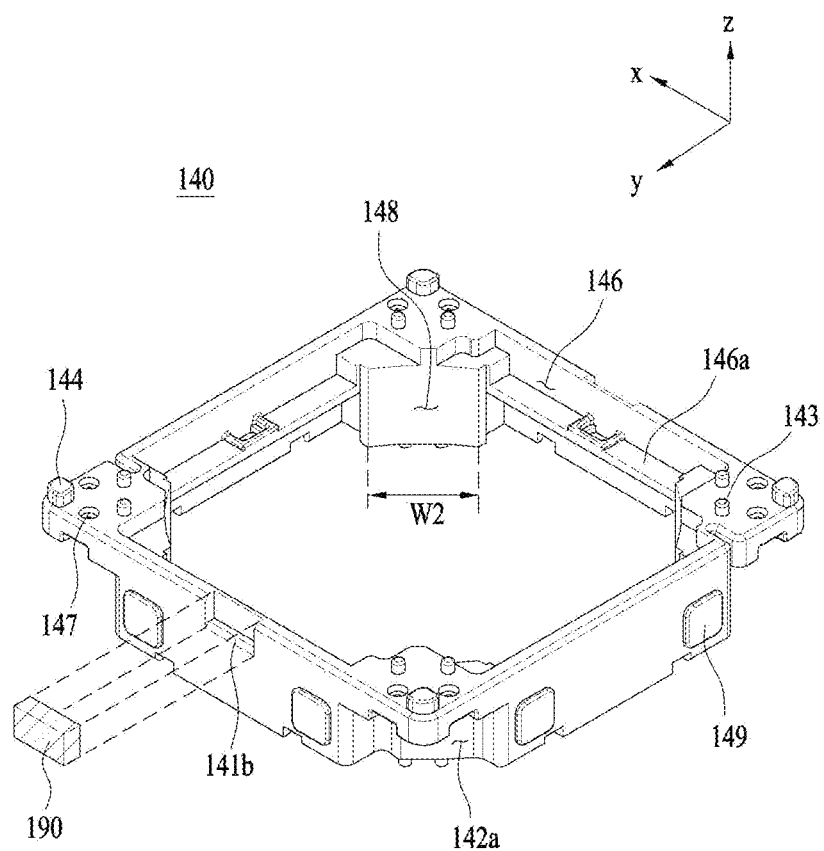
FIG. 6 is a top perspective view of the housing illustrated in FIG. 1.
Figure 7:
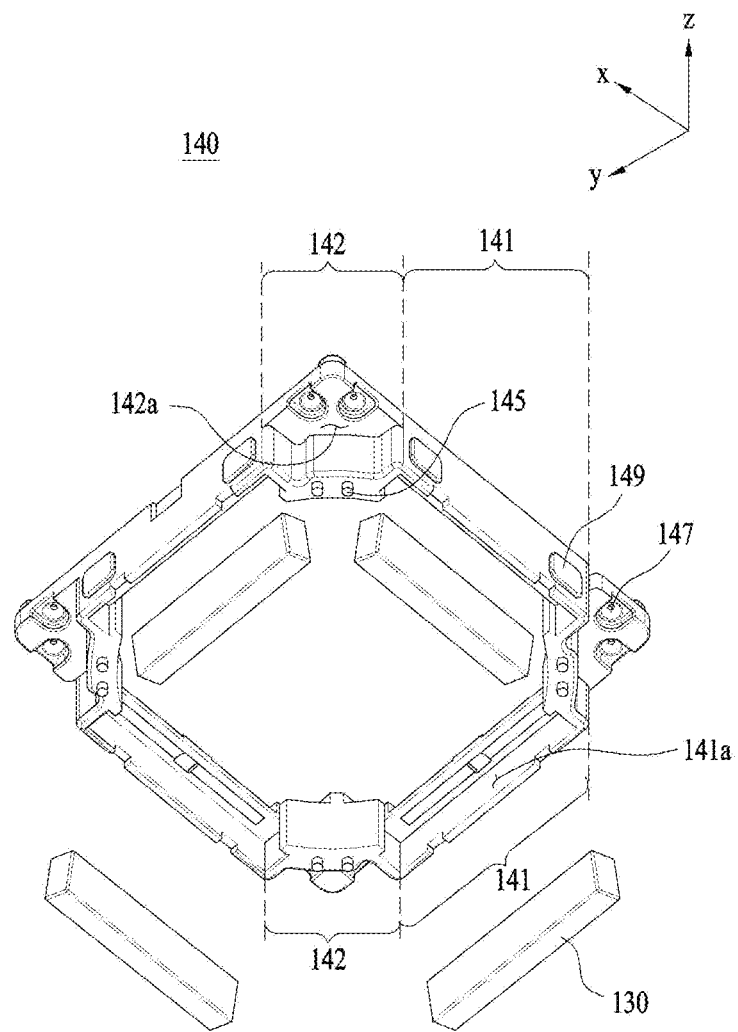
FIG. 7 is a bottom exploded perspective view of the housing, the first magnet, and the second magnet, which are illustrated in FIG. 2.
Figure 9:
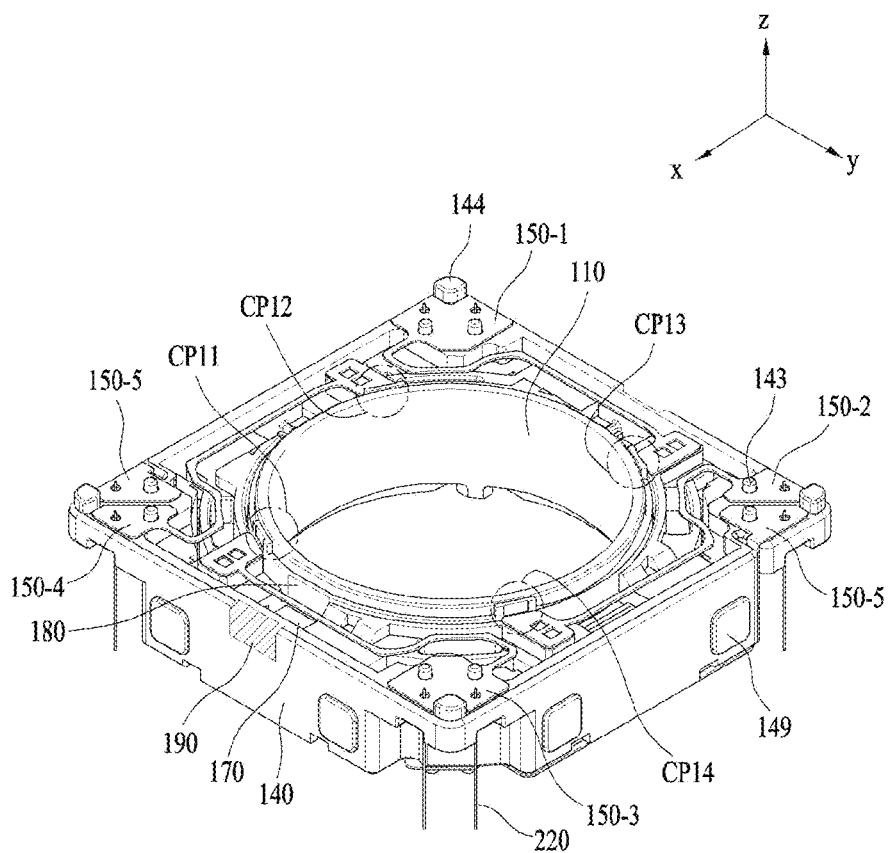
FIG. 9 is a plan perspective view illustrating the coupled state of the bobbin, the housing, the upper elastic member, the first position sensor, the sensor board, and the plurality of support members, which are illustrated in FIG. 2.
Figure 10:
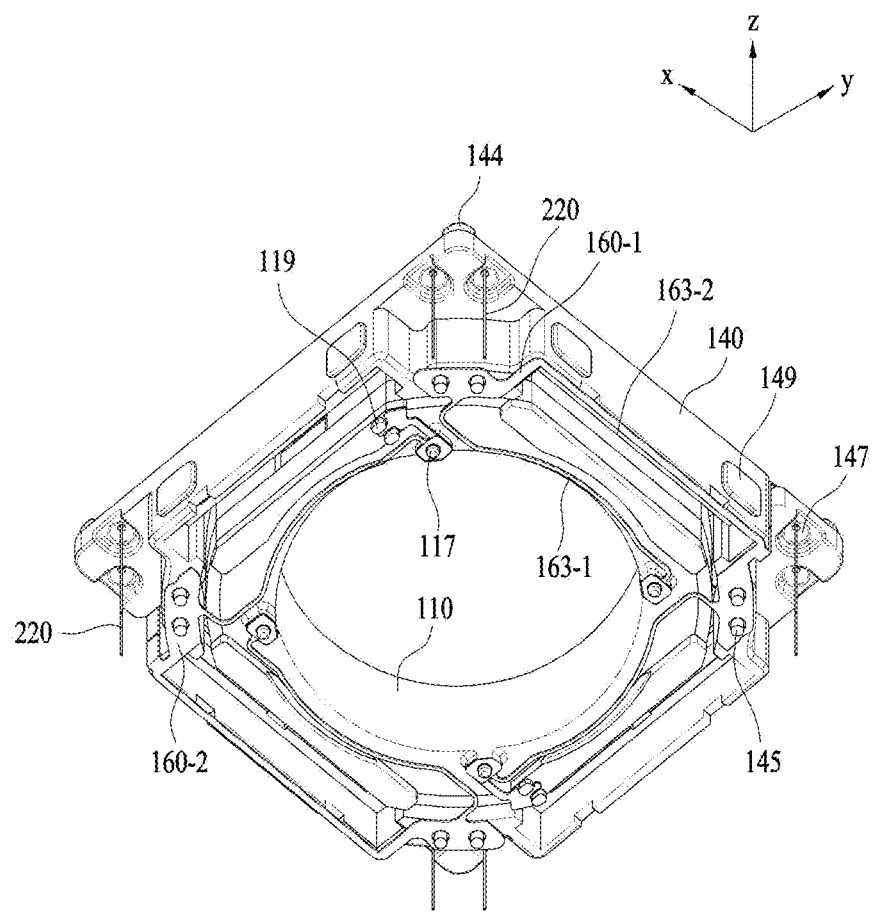
FIG. 10 is a bottom perspective view illustrating the coupled state of the bobbin, the housing, the lower elastic member, and the plurality of support members, which are illustrated in FIG. 2.

FIG. 6 is a top perspective view of the housing 140 illustrated in FIG. 2. FIG. 7 is a bottom exploded perspective view of the housing 140, the second magnet 190 and the first magnet 130, which are illustrated in FIG. 2. FIG. 8 is a sectional view taken along line I-I' in FIG. 3. FIG. 9 is a top perspective view of the coupled state of the bobbin 110, the housing 140, the upper elastic member 150, the first position sensor 170, the sensor board 180, and the support members 220, which are illustrated in FIG. 2. FIG. 10 is a bottom perspective view of the coupled state of the bobbin 110, the housing 140, the lower elastic member 160, and the support members 220, which are illustrated in FIG. 2.

The housing 140 may have the first seating groove 146 formed at a position thereof corresponding to the first and second protrusions 111 and 112 of the bobbin 110.

The housing 140 may include a third protrusion 148, which corresponds to the space defined between the first and second protrusions 111 and 112, and which has a first width W1.

The third protrusion 148 of the housing 140, which is opposite to the bobbin 110, may have a surface having the same shape as the side portion of the bobbin 110. Here, there may be a predetermined difference between the first width W1 between the first and second protrusions 111 and 112 of the bobbin 110, which is illustrated in FIG. 4, and the second width W2 of the third protrusion 148 of the housing 140, which is illustrated in FIG. 4. Consequently, it is possible to restrict the rotation of the third protrusion 148 between the first and second protrusions 111 and 112 of the bobbin 110. As a result, it is possible for the third protrusion 148 of the housing 140 to inhibit the bobbin 110 from being rotated even if the bobbin 110 receives force in the direction in which the bobbin 110 is rotated about the optical axis, rather than being rotated in the optical axis direction.

For example, the upper edge of the outer periphery of the housing 140 may have a square plan shape, whereas the lower edge of the inner periphery may have an octagonal plan shape, as exemplarily illustrated in FIGS. 6 and 7. The housing 140 may include a plurality of side portions. For example, the housing 140 may include four first side portions 141 and four second side portions 142, and the width of each of the first side portions 141 may be greater than the width of each of the second side portions 142.

The first side portions 141 of the housing 140 may correspond to the portions on which the first magnet 130 is mounted. Each of the second side portions 142 of the housing 140 may be disposed between the two adjacent first side portions 141, and may correspond to portions on which the support members 220 are disposed. Each of the first side portions 141 of the housing 140 may connect the two adjacent second side portions 142 of the housing 140, and may have flat surfaces having a predetermined depth.

Each of the first side portions 141 of the housing 140 may have a surface area that is equal to or larger than the surface area of the first magnet 130, which corresponds to the first side portion 141.

The housing 140 may have a first magnet seat 141b for accommodating the second magnet 190 and second magnet seats 141a for accommodating the first magnets 130-1 to 130-4.

For example, the housing 140 may have the first magnet seat 141b, which is formed in the upper end of the outer portion of one of the first side portions 141, and the second magnet seats 141a, which are formed in the lower end of the inner portion of the first side portions 141.

The first magnet seat 141b may be positioned above the second magnet seats 141a.

For example, the first magnet seat 141b may be spaced apart from the second magnet seats 141a, and the detailed description thereof will be given later.

The second magnet 190 may be fitted in and secured to the first magnet seat 141b, and each of the first magnets 130-1 to 130-4 may be fixed to the second magnet seat 141a, which is provided on a corresponding one of the first side portions 141 of the housing 140.

The second magnet seat 141a of the housing 140 may be configured to have the form of a recess having a size corresponding to the size of the first magnet 130, and may be configured to face at least three of the surfaces of the first magnet 130, that is, two lateral side surface and the upper surface of the first magnet 130.

An opening may be formed in the bottom surface of the second magnet seat 141a of the housing 140, that is, the surface that is opposite the second coil 230, which will be described later, and the bottom surface of the first magnet 130 seated on the second magnet seat 141a may directly face the second coil 230.

The first and second magnets 190 and 130 may be secured to the first and second magnet seats 141b and 141a of the housing 140 using an adhesive, without being limited thereto, and an adhesive member such as a piece of double-sided tape may be used.

Alternatively, the first and second magnet seats 141b and 141a of the housing 140 may be configured as mounting holes, which allow the first and second magnets 190 and 130 to be partially fitted thereinto or to be partially exposed therefrom, rather than being configured as the recess illustrated in FIGS. 6 and 7.

For example, the second magnet 190 may be positioned above one (for example, 130-1) of the first magnets 130-1, 130-2, 130-3 and 130-4. The second magnet 190 may be disposed so as to be spaced apart from the first magnet (for example, 130-1). The first side portion of the housing 140 may be partially disposed between the second magnet 190 and the second magnet (for example, 130-1).

The first side portion 141 of the housing 140 may be oriented parallel to the side surface of the cover member 300. In addition, the first side portion 141 of the housing 140 may be larger than the second side portion 142. The second side portion 142 of the housing 140 may be provided with paths through which the support members 220 extend. First through-holes 147 may be formed in the upper portion of the second side portion 142 of the housing 140. The support members 220 may be connected to the upper elastic member 150 through the first through holes 147.

In addition, in order to inhibit the housing 140 from directly colliding with the inner side surface of the cover member 300 illustrated in FIG. 1, the housing 140 may be provided at the upper end thereof with a second stopper 144.

The housing 140 may include at least one first upper support protrusion 143, formed on the upper surface thereof for the coupling of the upper elastic member 150.

For example, the first upper support protrusion 143 of the housing 140 may be formed on the upper surface of the housing 140 corresponding to the second side portion 142 of the housing 140. The first upper support protrusion 143 of the housing 140 may have a semispherical shape, as illustrated in the drawings, or may have a cylindrical shape or a prism shape, without being limited thereto.

The housing 140 may have second a lower support protrusion 145 formed on the lower surface thereof for the coupling and fixing of the lower elastic member 160.

In order to define paths for the passage of the support members 220 and to ensure the space to be filled with gel-type silicone, which serves as a damper, the housing 140 may have a first recess 142a formed in the second side portion 142. In other words, the first recess 142a of the housing 140 may be filled with damping silicone.

The housing 140 may have a plurality of third stoppers 149 protruding from the side portions 141 thereof. The third stoppers 149 serve to inhibit the housing 140 from colliding with the cover member 300 when the housing 140 moves in the second and third directions.

In order to inhibit the bottom surface of the housing 140 from colliding with the base 210 and/or the circuit board 250, which will be described below, the housing 140 may further have a fourth stopper (not shown) protruding from the bottom surface thereof. Through this configuration, the housing 140 may be spaced apart from the base 210, which is disposed thereunder, and may be spaced apart from the cover member 300, which is disposed thereabove, with result that the housing 140 may be maintained at a predetermined position in the optical axis direction without interference therebetween. In this way, the housing 140 may perform a shifting action in the second and third direction, that is, the anteroposterior direction and the lateral direction, on a plane perpendicular to the optical axis.

Next, the second magnet 190 and the first magnet 130 will be described.

The first magnet 130 may be disposed on the second magnet seat 141a of the housing 140 so as to overlap the first coil 120 in the direction perpendicular to the optical axis.

In another embodiment, both the first and second magnets 190 and 130 may be disposed outside or inside the first side portion 141 of the housing 140, or may be disposed inside or outside the second side portion 142 of the housing 140.

In a further embodiment, the second magnet 190 may be accommodated in the inner portion of the first side portion 141 of the housing 140, and the first magnet 130 may be accommodated in the outer portion of the first side portion 141 of the housing 140.

The first magnet 130 may have a form that corresponds to the first side portion 141 of the housing 140, that is, the form of an approximately rectangular parallelepiped. The surface of the first magnet 130 that faces the first coil 120 may have a radius of curvature that corresponds to that of the first coil 120.

The first magnet 130 may be configured as a single body. In the embodiment, referring to FIG. 5A, the first magnet 130 may be oriented such that the surface thereof facing the first coil 120 is the S-pole 132 and the opposite surface is the N-pole 134, without being limited thereto, and the opposite configuration is also possible.

At least two first magnets 130 may be provided, and in the embodiment, four first magnets 130 may be installed. The first magnet 130 may have an approximately rectangular shape, as illustrated in FIG. 5A, or may have a triangular or diamond shape.

Although the surface of the first magnet 130 that faces the first coil 120 may be linear, the disclosure is not limited thereto. When the corresponding surface of the first coil 120 is curved, the surface of the first magnet 130 that faces the first coil 120 may be curved so as to have a radius of curvature corresponding to the surface of the first coil 120.

By virtue of this configuration, it is possible to keep the distance between the first magnet 130 and the first coil 120 constant. In an embodiment, four first side portions 141 of the housing 140 may be provided with the first magnets 130-1, 130-2, 130-3 and 130-4, respectively, without being limited thereto. In some designs, only one of the first magnet 130 and the first coil 120 may have a flat surface, and the other of the first magnet 130 and the first coil 120 may have a curved surface. Alternatively, both the first coil 120 and the first magnet 130, which face each other, may have curved surfaces. In this case, the surface of the first coil 120 may have the same radius of curvature as the surface of the first magnet 130.

When the first magnets 130 have a rectangular flat surface, as illustrated in FIG. 5A, a pair of magnets, among the plurality of first magnets 130, may be arranged in the second direction so as to be parallel to each other, and the other pair of magnets may be arranged in the third direction so as to be parallel to each other. By virtue of the arrangement, it is possible to control the movement of the housing 140 for handshake correction, which will be described later.

Next, the upper elastic member 150, the lower elastic member 160, and the support members 220 will be described.

The upper elastic member 150 and the lower elastic member 160 elastically support the bobbin 110. The support members 220 may support the housing 140 so as to be movable relative to the base 210 in the direction perpendicular to the optical axis, and may conductively connect at least one of the upper and lower elastic members 150 and 160 to the circuit board 250.

The upper elastic member 150 may be coupled to the upper end (or the upper surface) of the bobbin 110 and the upper end (or the upper surface) of the housing 140, and the lower elastic member 160 may be coupled to the lower end (or the lower surface) of the bobbin 110 and the lower end (or the lower surface) of the housing 140.

Figure 11:
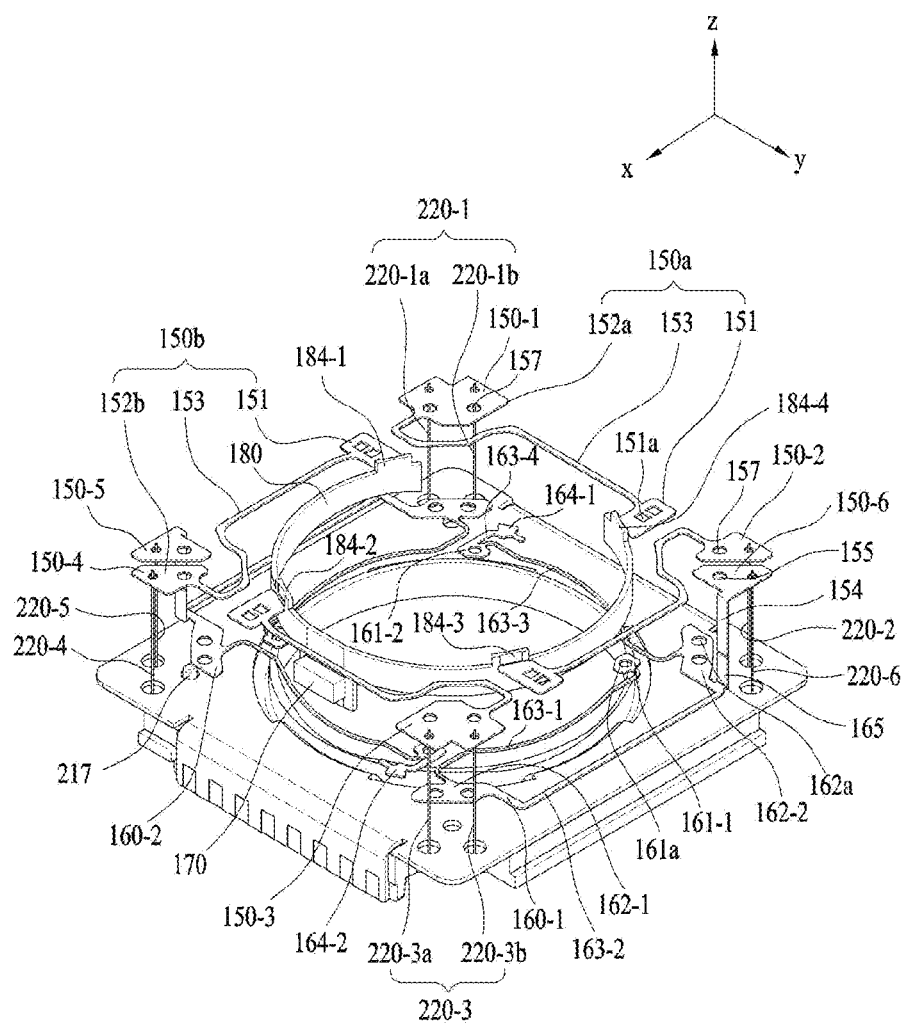
FIG. 11 is an assembled perspective view illustrating the upper elastic member, the lower elastic member, the first position sensor, the sensor board, the base, the support members, and the circuit board, which are illustrated in FIG. 2.

FIG. 11 is an assembled perspective view illustrating the upper elastic member 150, the lower elastic member 160, the first position sensor 170, the sensor board 180, the base 210, the support members 220, and the circuit board 250, which are illustrated in FIG. 2.

The upper elastic member 150 may include a plurality of upper elastic members 150; 150-1 to 150-4, which are conductively separated and spaced apart from one another.

The elastic member contact portions 184-1 to 184-4 of the sensor board 180 may be conductively connected to at least one of the upper elastic member 150 and the lower elastic member 160.

For example, although FIG. 11 illustrates that the elastic member contact portions 184-1 to 184-4 come into electrical contact with the upper elastic members 150-1 to 150-4, the disclosure is not limited thereto. In another embodiment, the elastic member contact portions 184-1 to 184-4 may come into electrical contact with the lower elastic member 160, or may come into electrical contact with both the upper elastic member 150 and the lower elastic member 160.

Each of the respective elastic member contact portions 184-1 to 184-4, which are conductively connected to the first position sensor 170, may be conductively connected to a corresponding one of the upper elastic members 150-1 to 150-4. Each of the upper elastic members 150-1 to 150-4 may be conductively connected to a corresponding one of the support members 220-1 to 220-4.

Each one 150a of the first and third upper elastic members 150-1 and 150-3 may include a first inner frame 151, a first outer frame 152a, and a first frame connector 153.

Each one 150b of the second and fourth upper elastic members 150-2 and 150-4 may include the first inner frame 151, a first outer frame 152b, and the first frame connector 153.

The first inner frame 151 of the first to fourth upper elastic members 150-1 to 150-4 may be coupled to a corresponding one of the bobbin 110 and the elastic member contact portions 184-1 to 184-4.

As illustrated in FIG. 4, when the upper surface 112a of the second protrusion 112 of the bobbin 110 is flat, the first inner frame 151 of the upper elastic member 150 may be placed on the upper surface 112a of the second protrusion 112 of the bobbin 110, and may be secured thereto using an adhesive member.

The first outer frame 152a and 152b may be coupled to the housing 140, and may be connected to the support members 220. The first frame connector 153 of each of the upper elastic members 150-1 to 150-4 may connect the first inner frame 151 to the first outer frame 152a and 152b.

Although the first outer frame 152b may be formed by bisecting the first outer frame 152a, the disclosure is not limited thereto. In another embodiment, the first outer frame 152a may be bisected so as to have the same shape as the first outer frame 152b.

The first frame connector 153 may be bent at least one time so as to form a predetermined pattern. Upward and/or downward movement of the bobbin 110 in the first direction parallel to the optical axis may be elastically supported via positional variation and fine deformation of the first frame connector 153.

The first outer frame 152a or 152b of the upper elastic member 150 illustrated in FIG. 11 may be coupled and secured to the housing 140 by means of the first upper support protrusion 143 of the housing 140. In the embodiment, each of the first outer frames 152a and 152b may be formed with a second of second through-hole 157, which has a shape and position corresponding to those of the first upper support protrusion 143. Here, the first upper support protrusion 143 and the second of second through-hole 157 may be fixed to each other via thermal fusion, or using an adhesive such as, for example, epoxy.

By virtue of conductive connections between the elastic member contact portions 184-1 to 184-4 of the sensor board 180 and the first to fourth upper elastic members 150-1 to 150-4, four pins P11 to P22 of the first position sensor 170 may be conductively connected to the first to fourth upper elastic members 150-1 to 150-4.

The respective first to fourth upper elastic members 150-1 to 150-4 may be connected to the circuit board 250 via the support members 220-1 to 220-4. That is, the first upper elastic members 150-1 may be conductively connected to the circuit board 250 via at least one of the first of first and second of first support members 220-1a and 220-1b, and the second upper elastic members 150-2 may be conductively connected to the circuit board 250 via the second support members 220-2. The third upper elastic members 150-3 may be conductively connected to the circuit board 250 via at least one of the first of third and second of third support members 220-3a and 220-3b, and the fourth upper elastic members 150-4 may be conductively connected to the circuit board 250 via the fourth support members 220-4.

The first position sensor 170 may receive a drive signal, for example, first and second powers having different polarities, from the circuit board 250 through two (for example, 150-1 and 150-2) of the first to fourth upper elastic members 150-1 to 150-4 and the support members connected to the upper elastic members (for example, 220-1 and 220-2). The first position sensor 170 may output an output signal thereof to the circuit board 250 through the remaining two (for example, 150-3 and 150-4) of the first to fourth upper elastic members 150-1 to 150-4 and the support members connected to the upper elastic members (for example, 220-3 and 220-4).

Meanwhile, the lower elastic member 160 may include first and second lower elastic members 160-1 and 160-2, which are conductively separated and spaced apart from each other. The first coil 120 may be connected to the support members 220-5 and 220-6 through the first and second lower elastic members 160-1 and 160-2.

Each of the first and second lower elastic members 160-1 and 160-2 may include at least one second inner frame 161-1 or 161-2, at least one second outer frame 162-1 or 162-2, and at least one second frame connector 163-1 or 163-2.

The second inner frames 161-1 and 161-2 may be coupled to the bobbin 110, and the second outer frames 162-1 and 162-2 may be coupled to the housing 140. The first of second frame connector 163-1 may connect the second inner frame 161-1 and the second outer frame 162-1 to each other, the second of second frame connector 163-2 may connect the second inner frame 161-2 and the second outer frame 162-2 to each other, and the third of second frame connector 163-3 may connect the second inner frame 161-2 and the second outer frame 162-2 to each other.

The first lower elastic member 160-1 may further include a first coil frame 164-1, and the second lower elastic member 160-2 may further include the second coil frame 164-2.

Referring to FIG. 11, each of the first and second coil frames 164-1 and 164-2 of the lower elastic member 160 may be connected to a corresponding one of two ends of the first coil 120 via conductive connection members such as solder. The first and second lower elastic members 160-1 and 160-2 may receive drive signals, for example drive current, from the circuit board 250, and may transfer the first and second powers having different polarities to the first coil 120.

Each of the first and second lower elastic members 160-1 and 160-2 may further include a fourth of second frame connector 163-4. The fourth of second frame connector 163-4 may connect the coil frame 164 to the second inner frame 161-2.

At least one of the first of second to fourth of second frame connectors 163-1 to 163-4 may be bent once or more so as to define a predetermined pattern. In Particular, by positional variation and fine deformation of the first of second and third of second frame connectors 163-1 and 163-3, upward and/or downward movement of the bobbin 110 in the first direction, parallel to the optical axis, may be elastically supported.

In an embodiment, each of the first and second lower elastic members 160-1 and 160-2 may further include a bent portion 165. The bent portion 165 may be bent at the second of second frame connector 163-2 toward the upper elastic member 150 in the first direction.

The upper elastic member 160 may further include fifth and sixth upper elastic members 150-5 and 150-6. The first to sixth upper elastic members 150-1 to 150-6 may be conductively separated and spaced apart from one another.

Each of the fifth and sixth upper elastic members 150-5 and 150-6 may include a connecting frame 154 and a outer frame 155.

The connecting frame 154 may be connected to the bent portion 165, and may extend in the first direction. The outer frame 155 may be bent at the connecting frame 154 in the direction perpendicular to the first direction, and may be coupled to the housing 155. The outer frame 155 may be connected to the support member 220-5 and 220-6. In other words, the fifth upper elastic member 150-5 may be connected to the fifth support member 220-5, and the sixth upper elastic member 150-6 may be connected to the sixth support member 220-6. Here, the bent portion 165 of each of the first and second lower elastic members 160-1 and 160-2 may be integrally formed with the connecting frame 154 of the fifth or sixth upper elastic member 150-5 or 150-6 and the outer frame 155. Each of the first and second lower elastic members 160-1 and 160-2 and the fifth and sixth upper elastic members 150-5 and 150-6 may include portions 165 and 154, which are bent in the first direction.

The first and second lower elastic members 160-1 and 160-2 may receive powers from the circuit board 250 via the fifth and sixth upper elastic members 150-5 and 150-6, which are connected to the support members 220-5 and 220-6, and may transfer the powers to the first coil 120. Specifically, the first lower elastic member 160-1 may be connected to the circuit board 250 via the sixth upper elastic member 150-6 and the sixth support member 220-6, and the second lower elastic member 160-2 may be connected to the circuit board 250 via the fifth upper elastic member 150-5 and the fifth support member 220-5.

Although each of the upper and lower elastic members 150 and 160 of the embodiment is divided into two or more parts, in another embodiment, each of the upper and lower elastic members 150 and 160 may not be divided.

The second support protrusion 117 of the bobbin 110 may couple and secure the second inner frame 161-1 or 161-2 of the lower elastic member 160 to the bobbin 110. The second lower support protrusion 145 of the housing 140 may couple and secure the second outer frame 162-1 or 162-2 of the lower elastic member 160 to the housing 140.

Each of the second inner frames 161-1 and 161-2 of the first and second lower elastic members 160-1 and 160-2 may be provided with a third through hole 161a, which is formed at a position corresponding to the first lower support protrusion 117 of the bobbin 110 so as to have a shape corresponding to the first lower support protrusion 117 of the bobbin 110. Here, the first lower support protrusion 117 of the bobbin 110 and the third through hole 161a may be secured to each other via thermal fusion, or using an adhesive member such as epoxy.

Each of the second outer frames 162-1 and 162-2 of the first and second lower elastic members 160-1 and 160-2 may be provided with a fourth through hole 162a at a position corresponding to the second lower support protrusion 145 of the housing 140. Here, the second lower support protrusion 145 of the housing 140 and the fourth through hole 162a may be secured to each other via thermal fusion, or using an adhesive member such as epoxy.

Although each of the upper elastic member 150 and the lower elastic member 160 may be constituted by a leaf spring, the disclosure is not restricted as to the material used for the upper and lower elastic members 150 and 160.

The power may be supplied to the first position sensor 170 via two upper elastic members (for example, 150-1 and 150-2), which are conductively separated from each other, signals output from the first position sensor 170 may be transferred to the circuit board 250 via the other two upper elastic members (for example, 150-3 and 150-4), which are conductively separated from each other, and power may be supplied to the first coil 120 via two lower elastic members 160-1 and 160-2, which are conductively separated from each other. However, the disclosure is not limited thereto.

In another embodiment, the role of the upper elastic members 150-1 to 150-4 and the role of the lower elastic members 160-1 and 160-2 may be exchanged. Specifically, in still another embodiment, the lower elastic members may include four lower elastic members, which are conductively separated from each other. Here, power may be supplied to the first coil 120 via two upper elastic members, power may be supplied to the first position sensor 170 via two lower elastic members, and signals output from the first position sensor 170 may be transferred to the circuit board 250 via the other two lower elastic members, which are conductively separated from each other. Although this arrangement is not illustrated in the drawings, it will be apparent from the drawings.

In order to suppress the vibration or oscillation of the bobbin 110 caused by shocks or vibrations, a damper may be disposed in at least one of the space between the upper elastic member 150 and the bobbin, the space between the upper elastic member 150 and the housing 140, a space between the lower elastic member 160 and the bobbin 110 and the space between the lower elastic member 160 and the housing 140. The damper may composed of a sol or gel-type material, for example, epoxy.

Next, the support members 220 will be described.

The plurality of support members 220-1 to 220-6 may be disposed at respective second side portions 142. For example, two support members may be disposed at each of the four second side portions 142.

In another embodiment, only one support member may be disposed at each of two side portions 142 among the four second side portions 142 of the housing 140, and two support members may be disposed at each of the other two side portions 142.

In a further embodiment, the support members 220 may be disposed in the form of a leaf spring at the first side portions of the housing 140.

As described above, the support members 220 may form paths through which the power required by the first position sensor 170 and the first coil 120 is transferred, and may form paths through which signals output from the first position sensor 170 are supplied to the circuit board 250.

The support members 220 may be embodied as members for elastic support, for example leaf springs, coil springs, suspension wires or the like. In another embodiment, the support members 220 may be integrally formed with the upper elastic member.

Next, the base 210, the circuit board 250, and the second coil 230 will be described.

The base 210 may have a bore corresponding to the bore of the bobbin 110 and/or the bore of the housing 140, and may have a shape that corresponds to that of the cover member 300, for example, a square shape.

Figure 12:
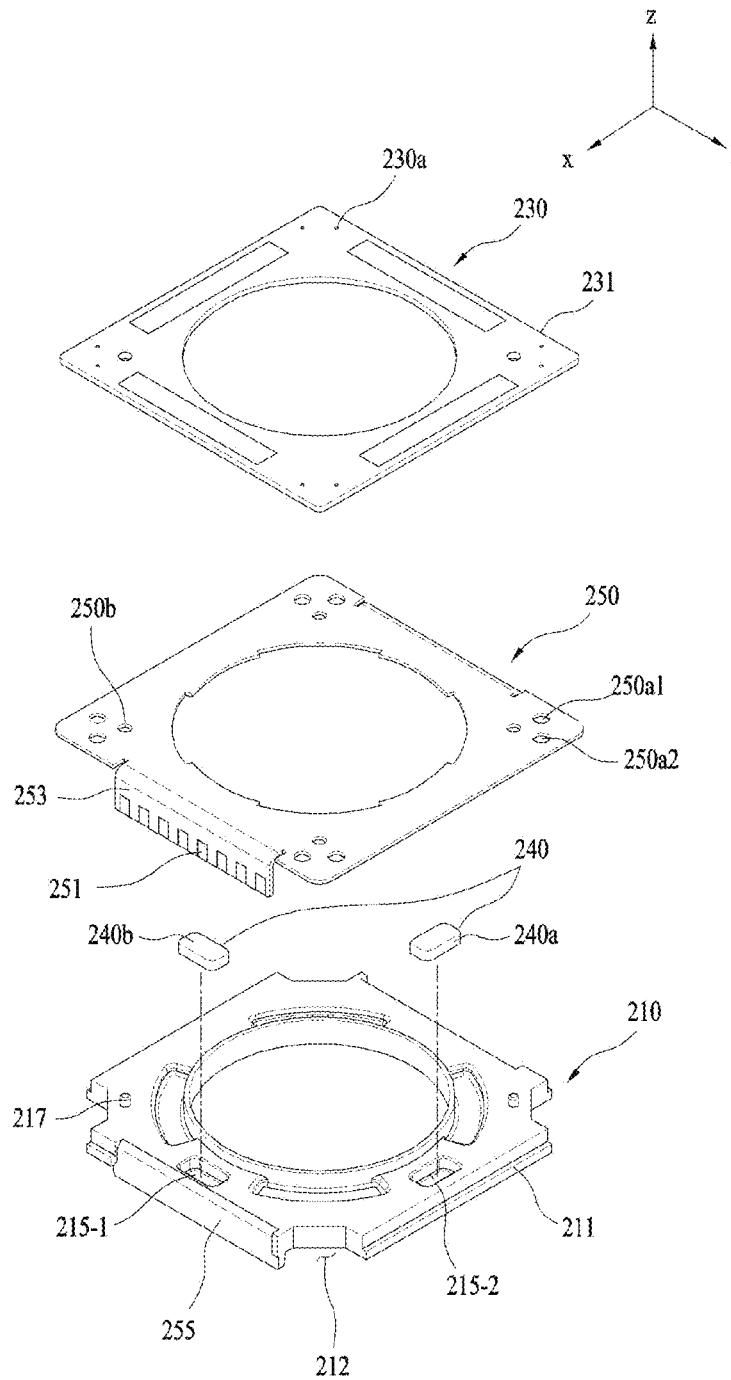
FIG. 12 is an exploded perspective view illustrating the base, the second coil and the circuit board illustrated in FIG. 1.

FIG. 12 is an exploded perspective view of the base 210, the second coil 230, and the circuit board 250, which are illustrated in FIG. 1.

The base 210 may have a stepped portion 211, to which an adhesive may be applied when the cover member 300 is secured to the base 210 using the adhesive. Here, the stepped portion 211 may guide the cover member 300 coupled to the upper side thereof, and may be coupled to the end of the cover member 300 in a surface-contact manner.

The stepped portion 211 of the base 210 and the end of the cover member 300 may be attached or secured to each other using, for example, an adhesive.

The base 210 may be provided with a support portion 255 having a corresponding size on the surface thereof facing the terminal 251 of the circuit board 250. The support portion 255 of the base 210 may be formed on the outer side surface of the base 210, which does not have the stepped portion 211, and may support a terminal rib 253 of the circuit board 250.

A second recess 212 may be formed in each corner of the base 210. When the cover member 300 has a protrusion formed at each corner thereof, the protrusion of the cover member 300 may be fitted into the second recess 212 in the base 210.

In addition, seating recesses 215-1 and 215-2 may be formed in the upper surface of the base 210 so that the second position sensor 240 may be disposed in each of the seating recesses 215-1 and 215-2. In an embodiment, the base 210 may be provided with two seating recesses 215-1 and 215-2, in which the second position sensors 240 may be disposed, so as to detect the extent to which the housing 140 moves in the second and third directions. For example, although an angle defined between the imaginary lines, which are connected from the centers of the seating recesses 215-1 and 215-2 to the center of the base 1210, may be an angle of 90°, the disclosure is not limited thereto.

The seating recesses 215-1 and 215-2 in the base 210 may be disposed at or near the centers of the respective second coils 230, or the centers of the second coils 230 may coincide with the centers of the second position sensors 240.

The second coil 230 may be disposed above the circuit board 250, and the second position sensor 240 may be disposed under the circuit board 250. The second position sensor 240 may detect displacement of the housing 140 relative to the base 210 in directions (the X-axis or y-axis direction) perpendicular to the optical axis (that is, the z-axis).

The second position sensor 240 may include two sensors 240a and 240b, which are disposed at the base 210 so as to detect displacement of the housing 140 in the direction perpendicular to the optical axis.

The circuit board 250 may be disposed on the upper surface of the base 210, and may have a bore corresponding to the bore of the bobbin 110, the bore of the housing 140 and/or the bore of the base 210. The outer circumferential surface of the circuit board 250 may have a shape that coincides with or corresponds to the upper surface of the base 210, for example, a square shape.

The circuit board 250 may include at least one terminal rib 253, which is bent at the upper surface thereof and is provided with a plurality of terminals or pins 251, which receive electrical signals from the outside.

In FIG. 12, the second coil 230 is implemented as being provided on the circuit member 231, which is separate from the circuit board 250, without being limited thereto. In another embodiment, the second coil 230 may take the form of a ring-shaped coil block, an FP coil, or a circuit pattern formed on the circuit board 250.

The second coil 230 may have through-holes 230a formed in the circuit member 231. The support members 220 may extend through the through-holes 230a so as to be conductively connected to the circuit board 250.

The second coil 230 is located above the circuit board 250 so as to be opposite the first magnet 130 secured to the housing 140.

Although four second coils 230 may be installed on four sides of the circuit board 250, the disclosure is not limited thereto, and only two second coils may be installed respectively in the second direction and the third direction, or four or more second coils may be installed.

The housing 140 may move in the second direction and/or the third direction via interaction of the first magnet 130 and the second coil 230, which are arranged to be opposite each other as described above, thereby performing handshake correction.

The second position sensor 240 may be embodied as a Hall sensor, or any other sensor may be used as long as it can detect the strength of a magnetic field. For example, the second position sensor 240 may take the form of a driver that includes a Hall sensor, or may be embodied as a position detection sensor alone, such as, for example, a Hall sensor.

A plurality of terminals 251 may be installed on the terminal rib 253 of the circuit board 250. For example, the circuit board 250 may receive external powers through the plurality of terminals 251 installed on the terminal rib 253, and may supply the powers to the first and second coils 120 and 230 and the first and second position sensors 170 and 240. The circuit board 250 may outwardly output signals received from the first and second position sensors 170 and 240.

In the embodiment, although the circuit board 250 may be embodied as a Flexible Printed Circuit Board (FPCB), the disclosure is not limited thereto. The terminals 251 of the circuit board 250 may be directly formed on the surface of the base 210 via, for example, a surface electrode process.

The circuit board 250 may have through holes 250a1 and 250a2 through which the support members 220 extend. The support members 220 may be conductively connected to the respective circuit patterns formed on the bottom surface of the circuit board 250 via soldering or the like. In another embodiment, the circuit board 250 may not have the through holes 150a1 and 250a2, and the support members 220 may be conductively connected to the respective circuit patterns formed on the upper surface of the circuit board 250 via soldering or the like.

The circuit board 250 may further have a through hole 250b, which is coupled to an upper support protrusion 217 of the base 210. The upper support protrusion 217 of the base 210 and the through hole 250b of the circuit board 250 may be coupled to each other, as illustrated in FIG. 11, and may be secured to each other via an adhesive member such as epoxy.

Figure 13:
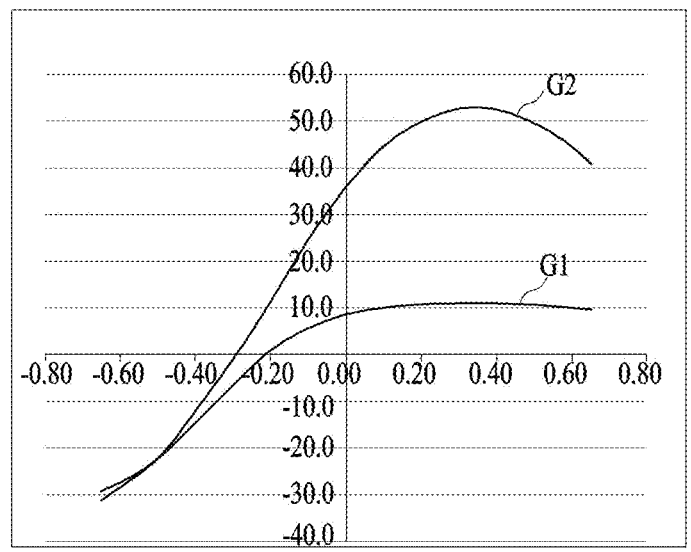
FIG. 13 illustrates the output of an auto-focusing position sensor according to movement of a movable unit.

FIG. 13 illustrates the output of an auto-focusing position sensor according to movement of the movable unit.

The horizontal axis (x-axis) represents the distance that the movable unit moves, and the vertical axis (y-axis) represents the output of the auto-focusing position sensor. The unit of the horizontal axis may be mm, and the unit of the vertical axis may be mV.

G1 indicates the output of the auto-focusing position sensor when there is only the driving magnet, without the detection magnet, and G2 indicates the output of the auto-focusing position sensor when both the driving magnet and the detection magnet, spaced apart from the driving magnet, are present. In the case of G2, the distance between the driving magnet and the detection magnet may be 0.03 mm.

Referring to FIG. 13, it will be noted that the linearity of output of the auto-focusing position sensor relative to the moving distance of the movable unit is not good owing to magnetic flux saturation at the upper portion of the G1 curve. Meanwhile, it is noted that the G2 curve has good linearity in a wide range because the distance between the detection magnet and the driving magnet is constant and the auto-focusing sensor is disposed in the space therebetween.

Figure 14:
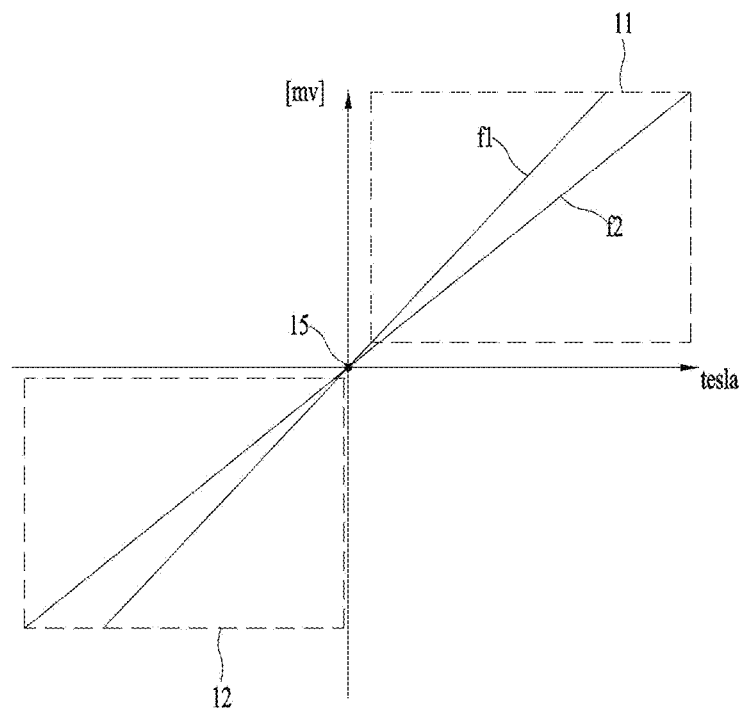
FIG. 14 illustrates variation in output of the auto-focusing sensor according to ambient temperature.

FIG. 14 illustrates variation in output of the auto-focusing sensor according to ambient temperature.

In FIG. 14, the horizontal axis represents the intensity of a magnetic field, the magnitude of current or the amount of displacement, and the vertical axis represents the output of the auto-focusing position sensor. For example, in the x-y coordinates system, in which the origin (0, 0) is used as the reference point, the x-axis represents the intensity of a magnetic field, and the y-axis represents the output of the auto-focusing position sensor. Here, the reference point 15 may be the point at which the output of the auto-focusing position sensor is zero. For example, the ambient temperature may be the temperature, to which the position sensor is subjected due to the heat generated while using a cellular phone or a camera module.

In the drawing, f1 indicates the output of the auto-focusing position sensor when the ambient temperature is 25° C., and f2 indicates the output of the auto-focusing position sensor when the ambient temperature is 65° C.

Referring to FIG. 14, the output of the auto-focusing position sensor is proportional to the intensity of a magnetic field, and is lowered with increase in the ambient temperature. For example, under the conditions of a magnetic flux of 50 mT, an input current of the auto-focusing position sensor of 5 [mA] and an ambient temperature of 25° C.~125° C., the reduction rate of the output of the auto-focusing position sensor may be −0.06%/° C.

As illustrated in FIG. 14, it is noted that an the slope of the graph representing the output of the auto-focusing position sensor according to the intensity of a magnetic field is lowered with an increase in the ambient temperature. For example, when the ambient temperature is higher than 25° C. but lower than 65° C., the graph representing the output of the auto-focusing position sensor according to the intensity of a magnetic field may have a slope that is higher than that of f2 but lower than that of f1.

Since the output of the auto-focusing position sensor varies according to variation in the ambient temperature, the lens mounted on the lens moving apparatus may be defocused when auto-focusing feedback driving is performed. For example, owing to the auto-focusing feedback driving, the lens mounted on the lens moving apparatus may have a first focal point at 25° C. but may have a second focal point different from the first focal point at 65° C. The reason for this is because the output of the auto-focusing sensor at 65° C. is lower than the output of the auto-focusing position sensor at 25° C. and the lens mounted on the lens moving apparatus is displaced by the auto-focusing feedback driving based on the lowered output of the auto-focusing position sensor.

The focal length of the lens mounted on the lens moving apparatus as well as the output of the auto-focusing position sensor are affected by variation in the ambient temperature. For example, when the temperature of the movable unit or the ambient temperature increases, the lens mounted on the lens moving apparatus may expand, and the focal length of the lens may thus be increased.

By considering both variation in the output of the auto-focusing sensor according to variation in the ambient temperature and variation in the focal length of the lens according to variation in the ambient temperature, it is possible to suppress defocusing of the lens due to the variation in the ambient temperature.

For example, by automatically controlling variation of output of the auto-focusing position sensor so as to compensate for a change in the focal length of the lens caused by variation in the ambient temperature, it is possible to suppress defocusing of the lens mounted on the lens moving apparatus due to the variation in the ambient temperature.

The lens moving apparatus may be provided with a first lens, which increases in focal length with an increase in the ambient temperature. When the first lens is mounted on the lens moving apparatus, the first area within the first quadrant in the x-y coordinates plane shown in FIG. 14 may be selected as the area in which the voice coil motor (VCM) is used. Here, the first quadrant may be an area in which both the x coordinate and the y coordinate are positive, and the third quadrant may be an area in which both the x coordinate and the y coordinate are negative. In other words, the output range of the auto-focusing position sensor for auto-focusing feedback driving is controlled within the first area 11.

The reason why the first quadrant 11 is selected as the area, in which the voice coil motor (VCM) is used, is as follows.

First, because the output of the auto-focusing position sensor in the first quadrant and the output of the auto-focusing position sensor in the third quadrant move in opposite directions according to variation in the ambient temperature, the accuracy and reliability of auto-focusing driving may be lowered if both the first and third quadrants are used as the control area of auto-focusing driving.

Second, by virtue of first and second causes, the focus of the first lens mounted on the lens moving apparatus is automatically corrected upon auto-focusing feedback driving. Here, the first cause is the displacement of the first lens resulting from auto-focusing feedback driving due to a decrease in the output of the auto-focusing position sensor in the first quadrant as a result of an increase in the ambient temperature. The second cause is the increase in focal length of the first lens due to increase in the ambient temperature.

The first area 11 may include neither the origin (0,0) nor coordinates on the x-axis and y-axis defining the first quadrant. This is to compensate for variation in the focal length of the first lens due to the second cause.

However, when only the first area 11 in the first quadrant is selected as the area in which the voice coil motor (VCM) is used, the linear section in the intensity of a magnetic field detected by the auto-focusing position sensor may be shortened, and calibration for the auto-focusing feedback driving may not be easy. For example, the calibration may be a series of procedures or processes that are performed in order to amplify the output of the position sensor so as to adjust the output to the voltage range used in a device to which the lens moving apparatus is mounted.

For example, the output level of the first position sensor 170 is lower than the grayscale voltage corresponding to the digital code for controlling the current of the first coil 120. Accordingly, in order to reflect the output of the first position sensor 170 to the digital code for controlling the auto-focusing feedback control of controlling the current of the first coil 120, the output of the first position sensor 170 has to be amplified to within the range of grayscale voltage. However, when the output range of the first position sensor 170 is limited to the first area 11, the calibration process employing the amplification of output may be complicated.

When a second lens which has the focal length that decreases with an increase in the ambient temperature is mounted, the lens moving apparatus may select an area in the third quadrant of the x-y coordinates as the area in which the voice coil motor (VCM) is used.

Figure 15:
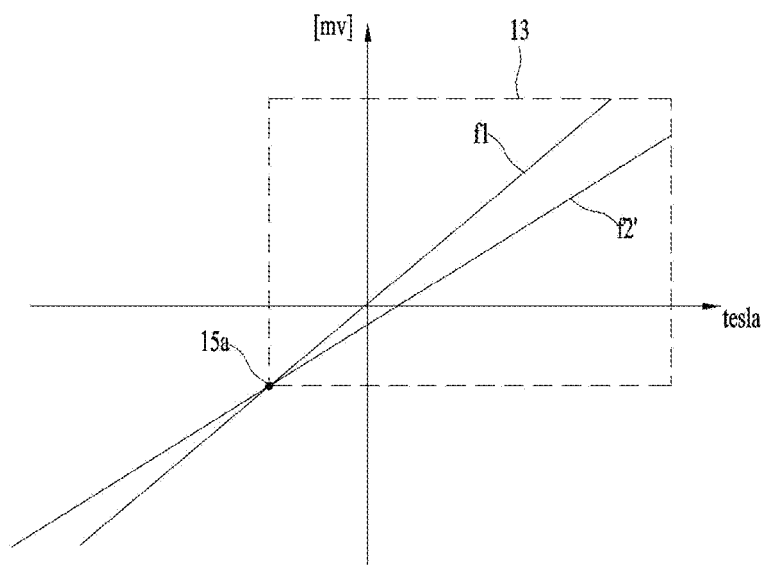
FIG. 15 illustrates an example of variation of output of the first position sensor mounted on the housing and the bobbin due to variation in the ambient temperature.
Figure 20:
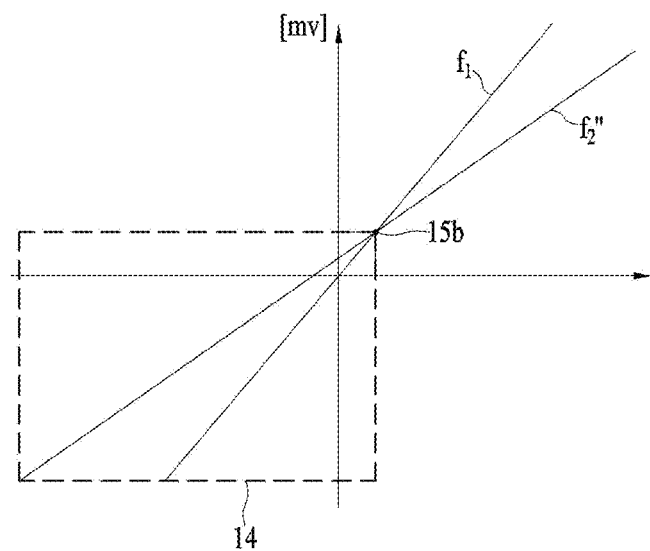
FIG. 20 illustrates another embodiment of variation of output of the first position sensor mounted on the housing, according to variation in the ambient temperature.

In order to facilitate the calibration process, the embodiment moves the cross point 15 shown in FIG. 14 to a first cross point 15a shown in FIG. 15 or a second cross point 15b shown in FIG. 20 and expands the output range of the first position sensor 170 for auto-focusing feedback driving as illustrated in FIGS. 15 and 20.

FIG. 15 illustrates an example of variation in the output of the first position sensor 170 mounted on the housing 140 and the bobbin 110 due to variation in the ambient temperature.

In FIG. 15, the horizontal axis represents the intensity of a magnetic field, the magnitude of current applied to the first coil 120 or the amount of displacement, and the vertical axis represents the output of the first position sensor 170. For example, in the x-y coordinates system in which the origin (0, 0) is used as the reference point, the x-axis represents the intensity of a magnetic field, and the y-axis represents the output of the first position sensor 170.

The first graph (f1) indicates the output of the first position sensor 170 over the intensity of a magnetic field detected by the first position sensor 170 when then ambient temperature is a first temperature, and the second graph (f2') indicates the output of the first position sensor 170 over the intensity of a magnetic field detected by the first position sensor 170 when the ambient temperature is a second temperature. The first temperature may range from 15° C. to 25° C., and the second temperature may be higher than 25° C. but lower than 65° C. For example, in FIG. 15, the first temperature may be 15° C., and the second temperature may be 65° C.

The reference point (0,0) may be the point at which the output of the first position sensor 170 is zero. For example, the output of the first position sensor 170 over the intensity of a magnetic field may be linear, and the slopes of the first graph (f1) and the second graph (f2) may be constant.

Referring to FIG. 15, in order to facilitate the calibration for auto-focusing feedback driving, the first cross point 15a between the first graph (f1) and the second graph (f2') may be located in the third quadrant, and the output of the first position sensor 170 for auto-focusing feedback driving may be controlled to be within the first area 13.

For example, the output range of the first position sensor 170 in the stroke range in which the bobbin 110 is movable may fall within the first area 13. Although the first area 13 may be an area including a value that is equal to or higher than a first reference value, the disclosure is not limited thereto. For example, the first reference value may be the output of the first position sensor 170 at the first cross point 15a.

For example, the first area 13 in FIG. 15 may include the first cross point 15a, may be equal to or higher than the first reference value, and may be an area spanning between the first quadrant and the third quadrant.

Generally, although the calibration is changed according to the characteristic amount of amplification by the driver performing calibration process, the calibration may be controlled by controlling the offset and the amount of amplification by the driver. Because the offset of the driver may increase with an increase in the amount of amplification by the driver, the result obtained from amplification of the output of the position sensor according to the set amount of amplification has to fall within the voltage range used in the device to which the lens moving apparatus is mounted.

In FIG. 14, the cross point 15 between f1 and f2 is the origin (0,0), and the first area 11 is located in the first quadrant. Meanwhile, in FIG. 15, in order to facilitate the calibration for auto-focusing feedback driving, the first cross point 15a between f1 and f2' may be located in the third quadrant, the first area 13 has a lower limit value at the first cross point 15a, which is located in the third quadrant, and the upper limit value, which is located in the first quadrant.

The location of the first cross point 15a in the third quadrant may be determined by an ambient temperature and the extent of expansion of the housing 140 due to variation in temperature. For example, as an ambient temperature and the extent of expansion of the housing 140 due to variation in temperature increase, the first cross point 15a may become distant from the origin (0,0).

For example, when the bias driving current of the first position sensor 1700 is 1 [mA], the output of the first position sensor 170 at the first cross point 15a may be lower than −10 mV.

The output range of the first position sensor 170, which corresponds to the stroke range of the auto-focusing movable unit, may be within the first area 13.

In the entire first area 13 of FIG. 15, the output of the first position sensor 170 may be lowered as the ambient temperature increases, given the same intensity of a magnetic field.

Even if the graph representing the output of the first position sensor 170 over variation in temperature is as illustrated in FIG. 15, it is sufficient for the range of output values of the first position sensor 170 for actual auto-focusing feedback driving to fall within the first area 13. The first area 13 may be represented as the output of the position sensor relative to the entire stroke of the movable unit (for example, the bobbin 110) upon auto-focusing driving.

For example, the range of the output values of the first position sensor 170 for auto-focusing feedback driving may be the same as the first area 13. The range of the output values of the first position sensor 170 for auto-focusing feedback driving may include the output value at the first cross point 15a.

Although the output value of the auto-focusing position sensor illustrated in FIG. 14 has only a positive value, the output value of the first position sensor 170 may have both positive and negative values, and the positive output value of the first position sensor 170 may be greater than the absolute value of the negative output value thereof. The range of output values of the first position sensor 170 for auto-focusing feedback driving may be from the lower limit value of the first cross point 15a to the upper limit value in the first quadrant. For example, the first cross point 15a may be located to be spaced apart from the origin (0,0), the x-axis and the y-axis.

In another embodiment, the range of output values of the first position sensor 170 in the stroke range in which the bobbin 110 is movable may not include the first cross point 15a. For example, the range of output values of the first position sensor 170 in the stroke range in which the bobbin 110 is movable may fall within the first area. Here, the first area may include a range larger than the range of the output of the first position sensor 170 at the first cross point 15a.

In another embodiment, the range of output values of the first position sensor 170 in the stroke range in which the bobbin 110 is movable may be a portion of the first area 13 in the first quadrant.

The reason for this is because it is impossible to sufficiently compensate for variation in the focal length of the first lens caused by variation in temperature because deviation in the output value of the first position sensor 170 due to variation in temperature is small in the vicinity of the first cross point 15a of FIG. 15. Accordingly, it is possible to sufficiently compensate for variation in the focal length of the first lens caused by variation in temperature by setting a portion of the first area 13 in the first quadrant, in which deviation in the output value of the first sensor 170 caused by variation in temperature is increased, to be the range of the output of the first position sensor 170 in the stroke range in which the bobbin 110 is movable.

When the range of output values of the first position sensor 170 for auto-focusing feedback driving does not include the first cross point 15a, the first cross point 15a may be the cross point between the extended lines of the graphs representing the output of the first position sensor 170 according to variation in temperature.

The reason why the area, in which the voice coil motor (VCM) is used, falls within the first area 13 of FIG. 15 is to make it easy to perform the two tasks described in FIG. 14 and the calibration for auto-focusing feedback driving.

In order to cause the range of the output of the first position sensor 170 for auto-focusing feedback driving to fall within the first area 13, the embodiment may have a structure in which the first magnets 130 and the second magnet 190 are spaced apart from the housing 140, the first position sensor 170 is disposed in a space between the first magnet 130 for driving and the second magnet 190 for detection and the distance between the second magnet 190 and the first position sensor 170 and the distance between the first and second magnets 130 and 190 are changed according to variation in the ambient temperature.

The first position sensor 170 may detect the sum of the intensity of a magnetic field of the first magnets 130 and the intensity of a magnetic field of the second magnet 190.

Figure 16:
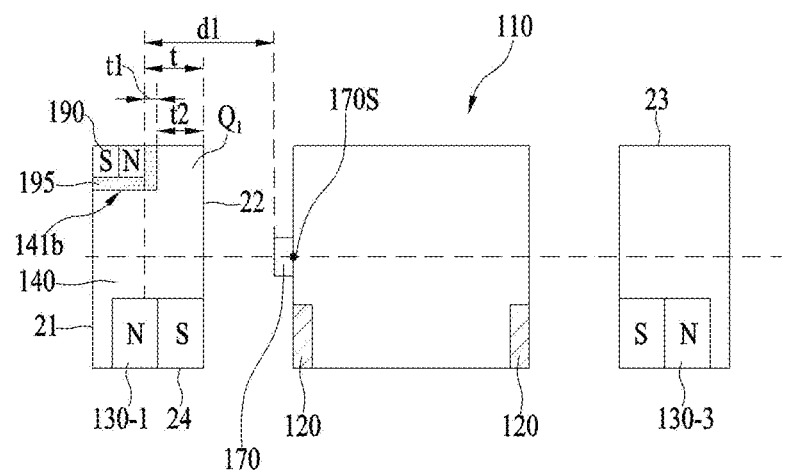
FIG. 16 illustrates a first embodiment of the relative positional relationships among the first position sensor, the second magnet, the first magnets and the first coil.

FIG. 16 illustrates a first embodiment of the relative positional relationships among the first position sensor 170, the second magnet 190, the first magnets 130 and the first coil 120.

Referring to FIG. 16, the first coil 120 may be disposed at the lower side of the outer circumferential surface of the bobbin 110, and the first position sensor 170 may be disposed at the outer circumferential surface of the bobbin 110 above the first coil 120 so as to be spaced apart from the first coil 120.

The first magnet 130 may be mounted on the housing 140 so as to face the first coil 120.

The movable unit, for example, the first magnet 130 may be disposed so at to face or to be aligned with the first coil 120 in the direction perpendicular to the first direction when the bobbin 110 is located at the initial position.

The first magnet 130 may be a monopole-magnetized magnet, which has different polarities at the inner and outer sides thereof. The boundary plane between the S pole and the N pole of the first magnet 130 may be parallel to the direction in which the first magnet 130 and the first coil 120 face each other. For example, the boundary plane between the S pole and the N pole of the first magnet 130 may be oriented to be parallel to the first direction parallel to the optical axis.

For example, although the first magnet 130 may be disposed on the housing 140 such that the surface thereof that faces the first coil 120 is an S pole and the opposite surface thereof is an N pole, the disclosure is not limited thereto, and the reverse disposition is also possible.

The second magnet 190 may be disposed or mounted on the housing 140 so as to be positioned above the first magnet 130. The second magnet 190 may be a monopole-magnetized magnet, which has an N pole and an S pole.

The boundary plane between the S pole and the N pole of the second magnet 190 disposed on the housing 140 may be parallel to the boundary plane between the S pole and the N pole of the first magnet 130, without being limited thereto. Although the second magnet 190 may be disposed on the housing 140 the surface of the second magnet 190 that faces the outer circumferential surface of the bobbin 110 is an N pole and the opposite surface thereof is an S pole, the disclosure is not limited thereto.

Although the second magnet 190 may have a smaller size than the first magnet 130, the disclosure is not limited thereto.

The second magnet 190 may be disposed at the upper side of the first magnet 130 so as to be spaced apart from the first magnet 130. For example, the second magnet 190 may at least partially overlap the first magnet 130 in the first direction, without being limited thereto.

For example, the housing 140 may include an inner circumferential surface 22, an outer circumferential surface 21 positioned opposite the inner circumferential surface 22, an upper surface 23, and a lower surface 23.

A first portion Q1 of the housing 140 may be positioned between the second magnet 190 and the inner circumferential surface 22 of the housing 140. The upper portion of the second magnet 190 may be exposed from the upper surface 23 of the housing 140, and one side surface of the second magnet 190 may be exposed from the outer circumferential surface 21 of the housing 140. For example, the outer circumferential surface 21 of the housing 140 may be the outer circumferential surface of the first side portion 141 of the housing 140.

For example, the upper ends of the N pole and the S pole of the second magnet 190 may be exposed from the upper surface 23 of the housing 140, and one side surface of the S pole of the second magnet 190 may be exposed from the outer circumferential surface 21 of the housing 140.

The first magnet seat 141b may be provided in the upper end of the housing 140 so as to have a recessed shape including a bottom surface and a side surface, and may have a first opening, which is open at the upper surface 230 of the housing 140, and a second opening, which is open at the outer circumferential surface 21 of the housing 140.

The first portion Q1 of the housing 140 may be disposed between the second magnet 190 mounted on the housing 140 and the inner circumferential surface 22 of the housing 140. For example, the first portion Q1 of the housing 140 may be disposed between the first magnet seat 141b and the inner circumferential surface 22 of the housing 140.

When the bobbin 110 is located at the initial position, the first position sensor 170 may be disposed on the outer circumferential surface of the bobbin 110 so as to be positioned in or aligned with the space between the first magnet 130 and the second magnet 190 in the first direction.

For example, the movable unit of the lens moving apparatus may move from the initial position in the +z-axis direction or the −z-axis direction due to electromagnetic interaction between the first coil 120 and the first magnet 130.

The movable unit may be an auto-focusing movable unit. The auto-focusing movable unit may include the bobbin 110 and components that are mounted on the bobbin 110 and are moved therewith. For example, the auto-focusing movable unit may include at least the bobbin 110 and a lens (not shown) mounted on the bobbin 110. In some embodiments, the movable unit may further include at least one of the first coil 120 and the first position sensor 170.

The initial position may be the initial position of the movable unit when no power is applied to the first coil 120, or may be the position at which the movable unit is disposed when the upper and lower elastic members 150 and 160 are elastically deformed by only the weight of the movable unit. At the initial position, the movable unit, for example the bobbin 110, may be spaced apart from the stationary unit, for example the housing 140, by means of the upper and lower elastic members 150 and 160.

For example, at the initial position, the first position sensor 170 may not overlap the second magnet 190 or the first magnet 130 in the direction perpendicular to the first direction, without being limited thereto.

In another embodiment, the first position sensor 170 in the initial position may partially overlap the second magnet 190 or the first magnet 130 in a direction perpendicular to the first direction.

The detecting portion 170s (Hall element) of the first position sensor 170 may be positioned so as to face the outer circumferential surface of the bobbin 110. For example, the detecting portion 170s of the first position sensor 170 may be disposed so as to detect the intensity of a magnetic field in which the line of magnetic force is directed from the inner circumferential surface toward the outer circumferential surface of the bobbin 110.

For example, at the initial position, the detecting portion 170s of the first position sensor 170 may be disposed on the outer circumferential surface of the bobbin 110 so as to be positioned in or aligned with the space between the first magnet 130 and the second magnet 190 in the first direction.

For example, at the initial position, the detecting portion 170s of the first position sensor 170 may not overlap the second magnet 190 or the first magnet 130 in the direction perpendicular to the first direction.

As illustrated in FIG. 16, an adhesive member 195 may be disposed between the second magnet 190 and the housing 140 so as to secure the second magnet 190 to the housing 140 via the adhesive member 195. For example, the adhesive member 195 may be disposed between the second magnet 190 and the first magnet seat 141b. For example, the adhesive member 195 may be disposed between the side surface and the bottom surface of the first magnet seat 141b and the magnet 190.

In FIG. 16, when the ambient temperature is a first temperature (for example, 25° C.), the thickness of the adhesive member 195 may be t1, and the thickness of the first portion Q1 of the housing 140 may be t2. The distance between one end of the second magnet 190 and one end of the first position sensor 170 may be d1.

Figure 17:
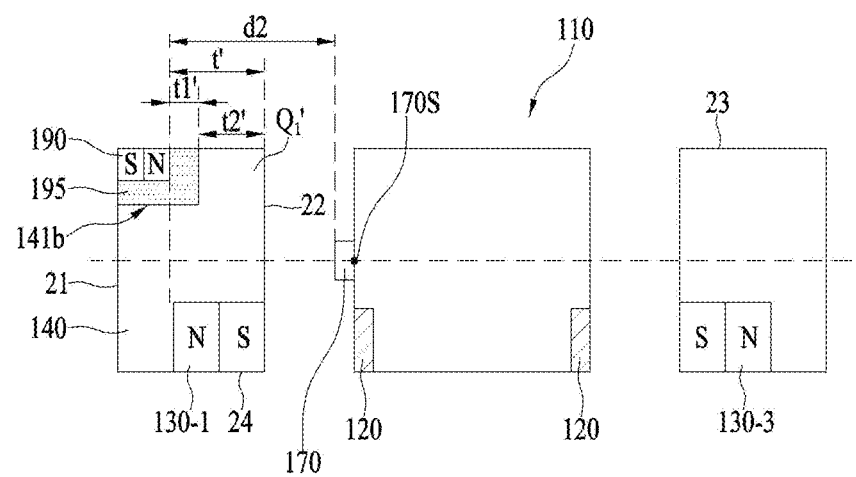
FIG. 17 illustrates the relative positional relationships among the first position sensor, the second magnet, the first magnets and the first coil, which are shown in FIG. 16, according to variation in the ambient temperature.

FIG. 17 illustrates the relative positional relationships among the first position sensor 170, the second magnet 190, the first magnets 130 and the first coil 120, which are shown in FIG. 16, according to variation in the ambient temperature.

Referring to FIG. 17, when an ambient temperature is a second temperature (for example, 65° C.), the adhesive member 195 and the housing 140 may expand. Specifically, when an ambient temperature increases to a second temperature (for example, 65° C.), the thickness of the adhesive member 195 may be t1' (>t1), the thickness of the first portion Q1' of the housing 140 may be t2' (>t2) and the distance between the one end of the second magnet 190 and the one end of the first position sensor 170 may be d2 (>d1). For example, when the ambient temperature increases from 25° C., the extent of expansion of the housing 140 may be 5 μm-10 μm.

As the ambient temperature increases, the distance between the second magnet 190 and the first position sensor 170 and the distance between the second magnet 190 and the first magnet 130 increase. As a result, the embodiment has an effect of decreasing the output of the first position sensor 170. As illustrated in FIG. 15, there is an effect of causing the position of the first cross point 15a to be moved into the third quadrant.

Figure 18:
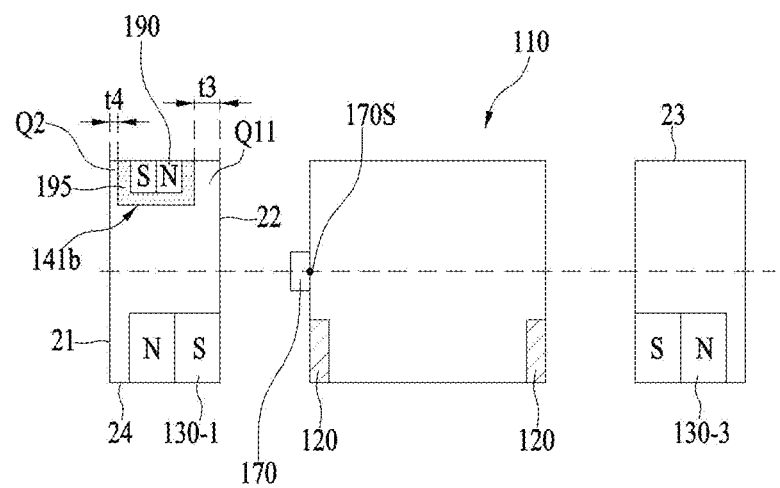
FIG. 18 illustrates a second embodiment of the relative positional relationships among the first position sensor, the second magnet, the first magnets and the first coil.

FIG. 18 illustrates a second embodiment of the relative positional relationships among the first position sensor 170, the second magnet 190, the first magnets 130 and the first coil 120. Reference numerals that are the same as those of FIG. 17 indicate the same components, and descriptions regarding the same components are simplified or omitted.

Referring to FIG. 18, the second magnet 190 may be spaced apart from both the inner circumferential surface and the outer circumferential surface 21 of the housing 140.

The first portion Q11 of the housing 140 is positioned between the second magnet 190 and the inner circumferential surface 22 of the housing 140, and the second portion Q2 of the housing 140 is positioned between the second magnet 190 and the outer circumferential surface 21 of the housing 140.

Only the upper portion of the second magnet 190 may be exposed from the upper surface 23 of the housing 140.

For example, the upper end of the N pole and the upper end of the S pole of the second magnet 190 may be exposed from the upper surface 23 of the housing 140.

The first magnet seat 141b may include an opening that is open at the upper surface 23 of the housing 140, and may be provided in the upper surface 23 of the housing 140 so as to be spaced apart from both the outer circumferential surface 21 and the inner circumferential surface 22 of the housing 140.

The first portion Q11 of the housing 140 may be positioned between the first magnet seat 141b and the inner circumferential surface 22 of the housing 140, and the second portion Q2 of the housing 140 may be positioned between the first magnet seat 141b and the outer circumferential surface 21 of the housing 140.

The thickness t3 of the first portion Q11 of the housing 140 is greater than the thickness t4 of the second portion Q2 of the housing 140 (t3>t4).

Because the thickness t3 of the first portion Q11 of the housing 140 is greater than the thickness t4 of the second portion Q2, the first portion Q11 may expand more than the second portion Q23 as the ambient temperature increases. Since the first portion Q1 expands more than the second portion Q2, the distance between the second magnet 190 and the first position sensor 170 may increase. Furthermore, as the ambient temperature increases, the distance between the first magnet 130 and the second magnet 190 may increase. Consequently, the embodiment may have effects of decreasing the output of the first position sensor 170 and of causing the position of the first cross point 15a to be moved into the third quadrant as illustrated in FIG. 15.

Figure 19:
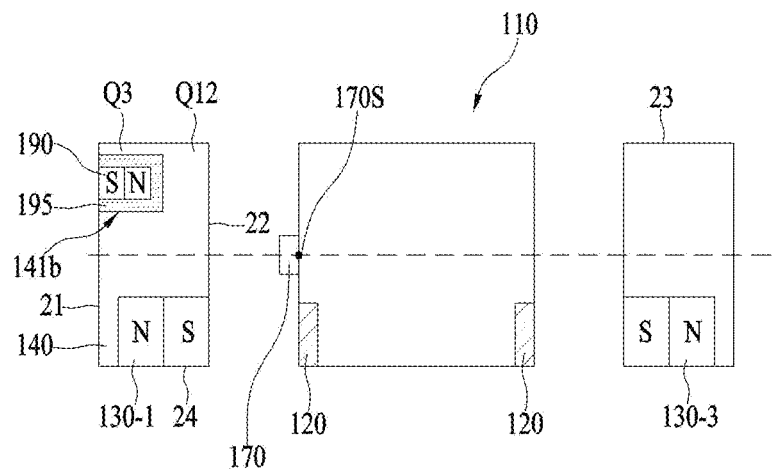
FIG. 19 illustrates a third embodiment of the relative positional relationships among the first position sensor, the second magnet, the first magnets and the first coil.

FIG. 19 illustrates a third embodiment of the relative positional relationships among the first position sensor 170, the second magnet 190, the first magnets 130 and the first coil 120. Reference numerals that are the same as those of FIG. 17 indicate the same components, and descriptions regarding the same components are simplified or omitted.

Referring to FIG. 19, the first portion Q12 of the housing 140 is positioned between the second magnet 190 and the inner circumferential surface 22 of the housing 140, and the third portion Q3 of the housing 140 is positioned between the second magnet 190 and the upper surface 23 of the housing 140.

Only one side surface of the second magnet 190 may be exposed from the outer circumferential surface 21 of the housing 140.

For example, the S pole of the second magnet 190 may be exposed from the outer circumferential surface 21 of the housing 140.

The first magnet seat 141b may be depressed from the outer circumferential surface 21 of the housing 140.

The first magnet seat 141b may include an opening that is open at the outer circumferential surface 21 of the housing 140, and may be provided in the outer circumferential surface 21 of the housing 140 so as to be spaced apart from both the upper surface 23 and the inner circumferential surface 22 of the housing 140.

The third portion Q3 of the housing 140 may be positioned between the first magnet seat 141b and the upper surface 23 of the housing 140, and the first portion Q12 of the housing 140 may be positioned between the first magnet seat 141b and the inner circumferential surface 22 of the housing 140 and between the third portion Q3 and the inner circumferential surface 22 of the housing 140.

Although the thickness of the first portion Q12 of the housing 140 may be greater than the thickness of the third portion Q3, the disclosure is not limited thereto.

Because the first magnet seat 141b is open at the outer circumferential surface 21 of the housing 140 and the first portion Q12 of the housing 140 is present between the first magnet seat 141b and the inner circumferential surface 22 of the housing 140, as the ambient temperature increases, the first portion Q12 of the housing 140 may expand, and the distance between the second magnet 190 and the first position sensor 170 may increase. Furthermore, as the ambient temperature increases, the distance between the first magnet 130 and the second magnet 190 may increase. Consequently, the embodiment may have effects of decreasing the output of the first position sensor 170 and of causing the position of the first cross point 15a to be moved into the third quadrant as illustrated in FIG. 15.

FIG. 20 illustrates another embodiment of variation of output of the first position sensor 170 mounted on the housing 140 according to variation in the ambient temperature. The horizontal axis and the vertical axis are the same as those of FIG. 15. Here, f1 indicates the output of the first position sensor 170 at an ambient temperature of 25° C., and f2" indicates the output of the first position sensor 170 at an ambient temperature of 65° C.

FIG. 20 illustrates the area of use of the first position sensor 170 of the lens moving apparatus to which a second lens, which has a focal length that is decreased with an increase in the ambient temperature, is mounted.

Referring to FIG. 20, in order to facilitate the calibration for auto-focusing feedback driving, the second cross point 15b between f1 and f2" may be located in the first quadrant, and the output value of the first position sensor 170 for auto-focusing feedback driving may be included in the second area 14.

The second area 14 of FIG. 20 may include the second cross point 15b, and may be an area spanning between the first quadrant and the third quadrant.

The output of the first position sensor 170 shown in FIG. 20 may have a positive value or a negative value. For example, the absolute positive value of the output of the first position sensor 170 shown in FIG. 20 may be less than the absolute value of a negative value.

In order to facilitate the calibration of auto-focusing feedback driving, the second cross point 15b may be located in the third quadrant, and the second area 14 may have an upper limit value at the second cross point 15b located in the first quadrant and a lower limit value located in the third quadrant.

For example, the second cross point 15b may be located so as to be spaced apart from the origin (0,0), the x-axis and the y-axis.

The position of the second cross point 15b in the first quadrant may be determined by the ambient temperature and the extent of expansion of the housing 140 due to variation in temperature. For example, as the ambient temperature and the extent of expansion of the housing 140 due to variation in temperature increase, the second cross point 15b may become distant from the origin (0,0).

The output of the first position sensor 170 in the entire second area 14 of FIG. 20 may increase as the ambient temperature increases, given the same intensity of a magnetic field.

The output range of the first position sensor 170 in the stroke range in which the bobbin 110 is movable may be included in the second area 14. Specifically, the output range of the first position sensor 170 of the lens moving apparatus according to the embodiment, to which a second lens is mounted, may be included in the second area 14. For example, the output value of the first position sensor 170 may be controlled within the second area 14.

The reason for this is to enable the focus of the second lens mounted on the lens moving apparatus to be automatically corrected upon auto-focusing feedback driving due to first and second causes. Here, the first cause is displacement of the second lens resulting from auto-focusing feedback driving due to an increase in the output of the auto-focusing position sensor in the second area 14 in response to an increase in the ambient temperature. The second cause is the decrease in focal length of the second lens due to an increase in the ambient temperature.

Since the second cross point 15b between f1 and f2" is located in the first quadrant, it is possible to easily perform the calibration for auto-focusing feedback driving.

For example, the range of output values of the first position sensor 170 for auto-focusing feedback driving may be the same as the second area 14. The range of output values of the first position sensor 170 for auto-focusing feedback driving may include the output value at the second cross point 15b.

The output value of the first position sensor 170 for auto-focusing feedback driving may range from the upper limit value of the second cross point 15b to the lower limit value located in the third quadrant. For example, the second cross point 15b may be located so as to be spaced apart from the origin (0,0), the x-axis and the y-axis.

Alternatively, the range of output values of the first position sensor 170 for auto-focusing feedback driving may not include the second cross point 15b. For example, the range of output values of the first position sensor 170 for auto-focusing driving may be the portion of the second area 14 located in the third quadrant.

The reason for this is because it is impossible to sufficiently compensate for variation in the focal length of the second lens caused by variation in temperature because deviation of the output value of the first position sensor 170 caused by variation in temperature is small in the vicinity of the second cross point 15*b* of FIG. 20. Accordingly, it is possible to sufficiently compensate for variation in the focal length of the first lens caused by variation in temperature by setting a portion of the second area 14 in the first quadrant, in which deviation in the output value of the first sensor 170 caused by variation in temperature is increased, to fall within the range of the output of the first position sensor 170 for auto-focusing feedback driving.

When the range of output values of the first position sensor 170 does not include the second cross point 15*b*, the second cross point 15*b* may be the cross point between the extended lines of the graphs representing the output of the first position sensor 170 according to variation in temperature.

Figure 21:
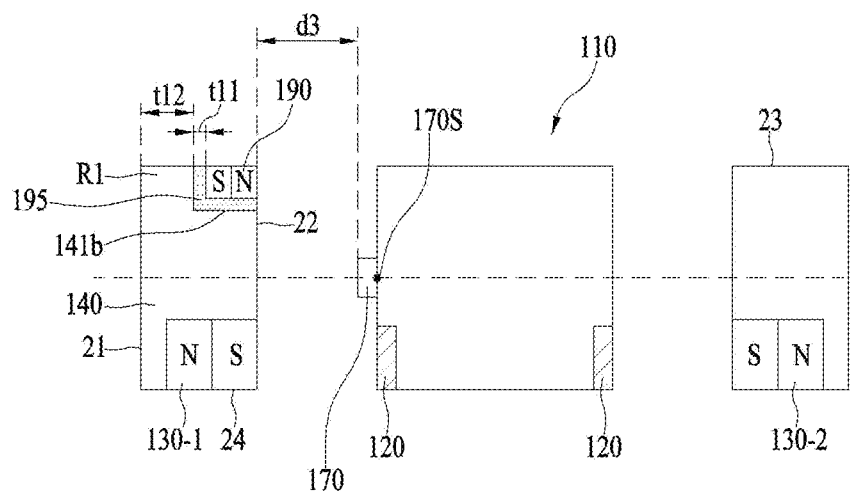
FIG. 21 illustrates a fourth embodiment of the relative positional relationships among the first position sensor, the second magnet, the first magnets and the first coil.

FIG. 21 illustrates a fourth embodiment of the relative positional relationships among the first position sensor 170, the second magnet 190, the first magnets 130 and the first coil 120. Reference numerals that are the same as those of FIG. 16 indicate the same components, and descriptions regarding the same components are simplified or omitted.

Referring to FIG. 21, a first portion R1 of the housing 140 may be positioned between the second magnet 190 and the outer circumferential surface 21 of the housing 140. The upper portion of the second magnet 190 may be exposed from the upper surface 23 of the housing 140, and one side surface of the second magnet 190 may be exposed from the inner circumferential surface 22 of the housing 140.

For example, the upper end of the N pole and the upper end of the S pole of the second magnet 190 may be exposed from the upper surface 23 of the housing 140, and one side surface of the N pole of the second magnet 190 may be exposed from the inner circumferential surface 22 of the housing 140.

The first magnet seat 141*b* may be provided in the upper end of the housing 140, and may include a first opening that is open at the upper surface 23 of the housing 140 and a second opening that is open at the inner circumferential surface 22 of the housing 140.

The first portion R1 of the housing 140 may be positioned between the second magnet 190, mounted on the housing 140, and the outer circumferential surface 21 of the housing 140. For example, the first portion R1 of the housing 140 may be positioned between the first magnet seat 141*b* and the outer circumferential surface 21 of the housing 140.

As illustrated in FIG. 21, the adhesive member 195 may be positioned between the second magnet 190 and the first magnet seat 141*b* so as to secure the second magnet 190 to the housing 140.

In the embodiment shown in FIG. 21, when the ambient temperature is a first temperature (for example, 25° C.), the thickness of the adhesive member 195 may be t11, and the thickness of the first portion R1 of the housing 140 may be t12. The distance between one end of the second magnet 190 and the first position sensor 170 may be d3.

Figure 22:
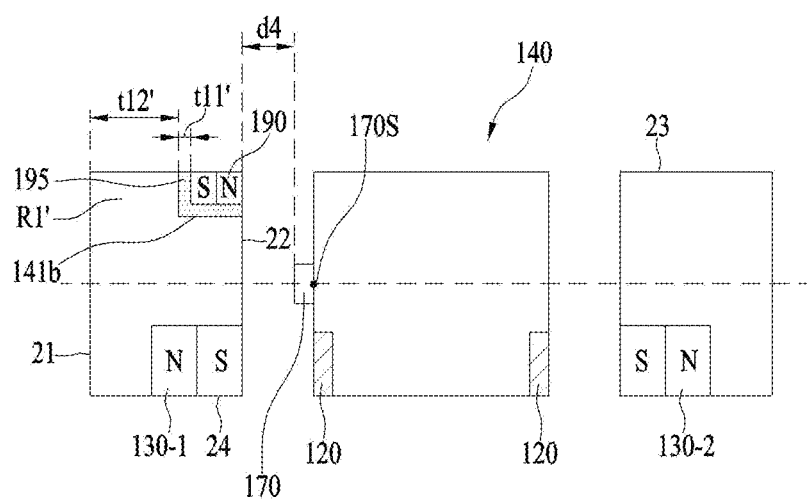
FIG. 22 illustrates the relative positional relationships among the first position sensor, the second magnet, the first magnets and the first coil, which are shown in FIG. 21, according to variation in temperature

FIG. 22 illustrates the relative positional relationships among the first position sensor 170, the second magnet 190, the first magnets 130 and the first coil 120, which are shown in FIG. 21, according to variation in temperature.

Referring to FIG. 22, when the ambient temperature is a second temperature (for example, 65° C.), the adhesive member 195 and the housing 140 may expand. Accordingly, the thickness of the adhesive member 195 may be t11' (>t11), the thickness of the first portion R1' may be t12' (>t12) and the distance between one end of the second magnet 190 and the first position sensor 170 may be d4 (<d3).

As the ambient temperature increases, owing to expansion of the adhesive member 195 and the housing 140, the distance between the second magnet 190 and the first position sensor 170 may decrease, and the distance between the first and second magnets 130 and 190 may decrease. Consequently, the embodiment may have an effect of increasing the output of the first position sensor 170. As illustrated in FIG. 20, there is an effect of enabling the position of the second cross point 15*b* to be moved into the first quadrant.

Figure 23:
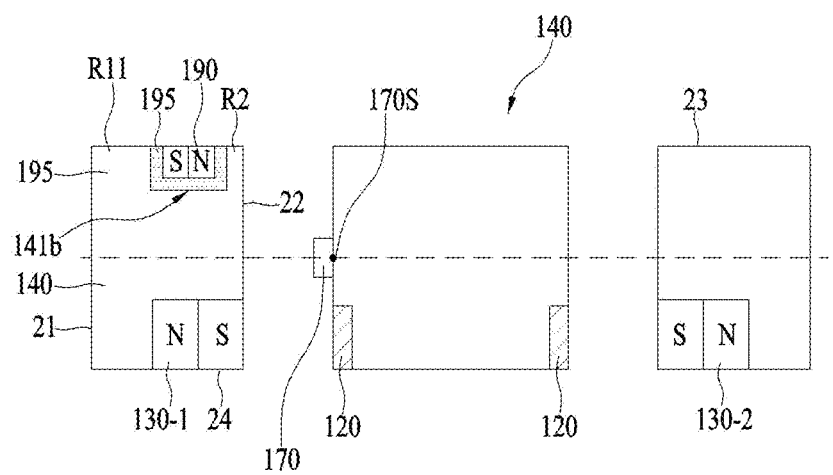
FIG. 23 illustrates a fifth embodiment of the relative positional relationships among the first position sensor, the second magnet, the first magnets and the first coil.

FIG. 23 illustrates a fifth embodiment of the relative positional relationships among the first position sensor 170, the second magnet 190, the first magnets 130 and the first coil 120. Reference numerals that are the same as those in FIG. 18 indicate the same components, and descriptions regarding the same components are simplified or omitted.

Referring to FIG. 23, a first portion R11 of the housing 140 is positioned between the second magnet 190 and the outer circumferential surface 21 of the housing 140, and a second portion R2 of the housing 140 may be positioned between the second magnet 190 and the inner circumferential surface 22 of the housing 140.

Only the upper portion of the second magnet 190 may be exposed from the upper surface 23 of the housing 140.

For example, the upper end of the N pole and the upper end of the S pole of the second magnet 190 may be exposed from the upper surface 23 of the housing 140.

The first magnet seat 141*b* of FIG. 23 may include an opening that is open at the upper surface 23 of the housing 140, and may be provided in the upper surface 23 of the housing 140 so as to be spaced apart from both the outer circumferential surface 21 and the inner circumferential surface 22 of the housing 140.

The first portion R11 of the housing 140 may be positioned between the first magnet seat 141*b* and the outer circumferential surface 21 of the housing 140, and the second portion R2 of the housing 140 may be positioned between the first magnet seat 141*b* and the inner circumferential surface 21 of the housing 140.

The thickness of the first portion R11 of the housing 140 is greater than the thickness of the second portion R2 of the housing 140 (R11>R2). In FIG. 23, since the thickness of the first portion R11 of the housing 140 is greater than the thickness of the second portion R2 of the housing 140, as the ambient temperature increases, the first portion R11 of the housing 140 may expand more than the second portion R2, and the distance between the second magnet 190 and the first position sensor 170 may decrease. Consequently, the embodiment may have effects of increasing the output of the first position sensor 170 and of causing the position of the second cross point 15*b* to be moved into the first quadrant, as illustrated in FIG. 20.

Figure 24:
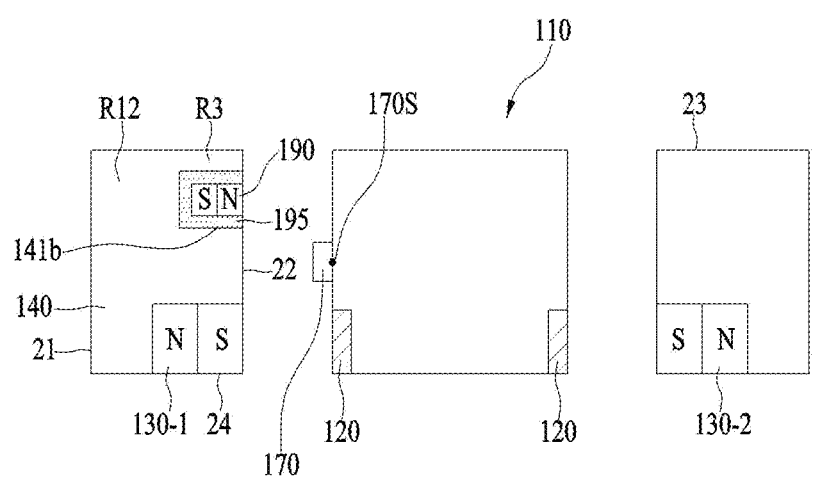
FIG. 24 illustrates a sixth embodiment of the relative positional relationships among the first position sensor, the second magnet, the first magnets and the first coil.

FIG. 24 illustrates a sixth embodiment of the relative positional relationships among the first position sensor 170, the second magnet 190, the first magnets 130 and the first coil 120. Reference numerals that are the same as those of FIG. 19 indicate the same components, and descriptions regarding the same components are simplified or omitted.

Referring to FIG. 24, a first portion R12 of the housing 140 is positioned between the second magnet 190 and the outer circumferential surface 21 of the housing 140, and a third portion R3 of the housing 140 is positioned between the second magnet 190 and the upper surface 23 of the housing 140.

Only one side surface of the second magnet 190 may be exposed from the inner circumferential surface 22 of the housing 140.

For example, the N pole of the second magnet 190 may be exposed from the inner circumferential surface 22 of the housing 140.

The first magnet seat 141b of FIG. 24 may include an opening that is open at the inner circumferential surface 22 of the housing 140, and may be provided in the inner circumferential surface 21 of the housing 140 so as to be spaced apart from both the upper surface 23 and the outer circumferential surface 21 of the housing 140.

The third portion R3 of the housing 140 may be positioned between the first magnet seat 141b and the upper surface 23 of the housing 140, and the first portion R12 of the housing 140 may be positioned between the first magnet seat 141b and the outer circumferential surface 21 of the housing 140 and between the third portion R3 and the outer circumferential surface 21 of the housing 140.

Although the thickness of the first portion R12 of the housing 140 may be greater than the thickness of the third portion R3 of the housing 140, the disclosure is not limited thereto.

Since the first magnet seat 141b of FIG. 24 is open at the inner circumferential surface 22 of the housing 140 and the first portion R12 of the housing 140 is present between the first magnet seat 141b and the outer circumferential surface 21 of the housing 140, as the ambient temperature increases, the first portion R12 of the housing 140 may expand, and the distance between the second magnet 190 and the first position sensor 170 may decrease. Consequently, the embodiment may have effects of increasing the output of the first position sensor 170 and of causing the position of the second cross point 15b to be moved into the first quadrant as illustrated in FIG. 20.

Figure 25:
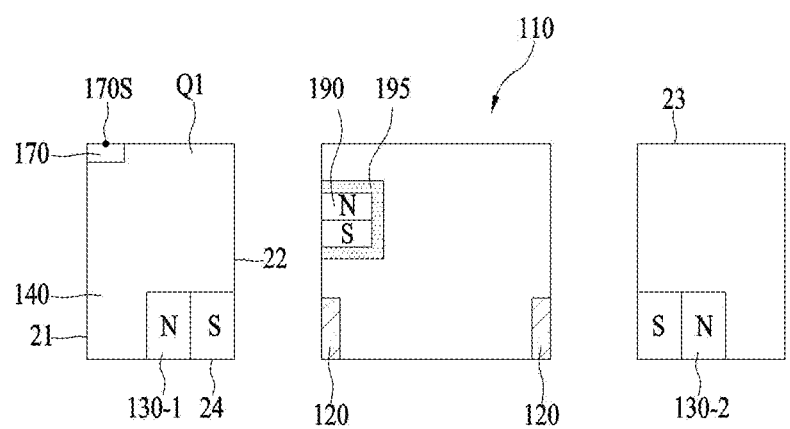
FIG. 25 illustrates a seventh embodiment of the relative positional relationships among the first position sensor, the second magnet, the first magnets and the first coil.

FIG. 25 illustrates a seventh embodiment of the relative positional relationships among the first position sensor 170, the second magnet 190, the first magnets 130 and the first coil 120.

Compared to the relative positional relationship shown in FIG. 16, the positions of the first position sensor 170 and the second magnet 190 are exchanged with each other in FIG. 25. In other words, the second magnet 190 may be disposed on the outer circumferential surface of the bobbin 110, and may be secured to the bobbin 110 via the adhesive member 195. The upper side of the second magnet 190 disposed on the outer circumferential surface of the bobbin 110 may be the N pole, and the lower side thereof may be the S pole.

The first position sensor 170 may be disposed on the upper end of the housing 140. The first portion Q1 of the housing 140 may be positioned between the first position sensor 170 and the inner circumferential surface 22 of the housing 140. The expansion of the housing 140 according to variation in temperature, variation in the distance between the first position sensor 170 and the second magnet 190, and variation in the output of the first position sensor 170 due to variation in the distance and the displacement of the first cross point 15a may be the same as those described in FIGS. 15 to 17.

The position of the first position sensor 170 shown in FIG. 25 may be changed into the position of the second magnet 190 shown in FIGS. 18 and 19.

Figure 26:
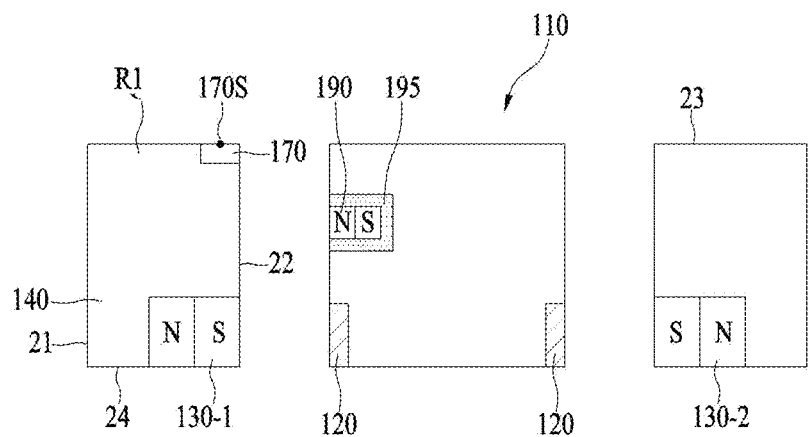
FIG. 26 illustrates an eighth embodiment of the relative positional relationships among the first position sensor, the second magnet, the first magnets and the first coil.

FIG. 26 illustrates an eighth embodiment of the relative positional relationships among the first position sensor 170, the second magnet 190, the first magnets 130 and the first coil 120.

Compared to the relative positional relationships shown in FIG. 21, the positions of the first position sensor 170 and the second magnet 190 are exchanged with each other in FIG. 26.

The first portion R1 of the housing 140 may be positioned between the first position sensor 170 and the outer circumferential surface 21 of the housing 140. Expansion of the housing 140 according to variation in temperature, variation in the distance between the first position sensor 170 and the second magnet 190, and variation in the output of the first position sensor 170 due to the variation in the distance and the displacement of the first cross point 15a may be the same as those described in connection with FIGS. 20 to 22.

The position of the first position sensor 170 shown in FIG. 26 may be changed into the position of the second magnet 190 shown in FIGS. 23 and 24.

The embodiment is able to suppress defocusing of the lens by compensating for variation in the output of the first position sensor 170 caused by variation in the ambient temperature and variation in the focal length of the lens mounted on the lens moving apparatus.

Furthermore, the embodiment is able to easily perform calibration for auto-focusing feedback driving by moving the cross point between graphs representing the output of the first position sensor according to variation in temperature into the first quadrant from the origin of the x-y coordinates or into the third quadrant from the origin of the x-y coordinates.

In addition, since the range of output values of the first position sensor 170 used for auto-focusing feedback driving does not include the cross points 15a and 15b, the embodiment is able to sufficiently compensate for variation in the focal length of the lens caused by variation in temperature.

Meanwhile, the lens moving apparatuses according to the above-described embodiments may be used in various fields such as, for example, a camera module. The camera module may be applied to, for example, a mobile appliance such as a cellular phone or the like.

Figure 27:
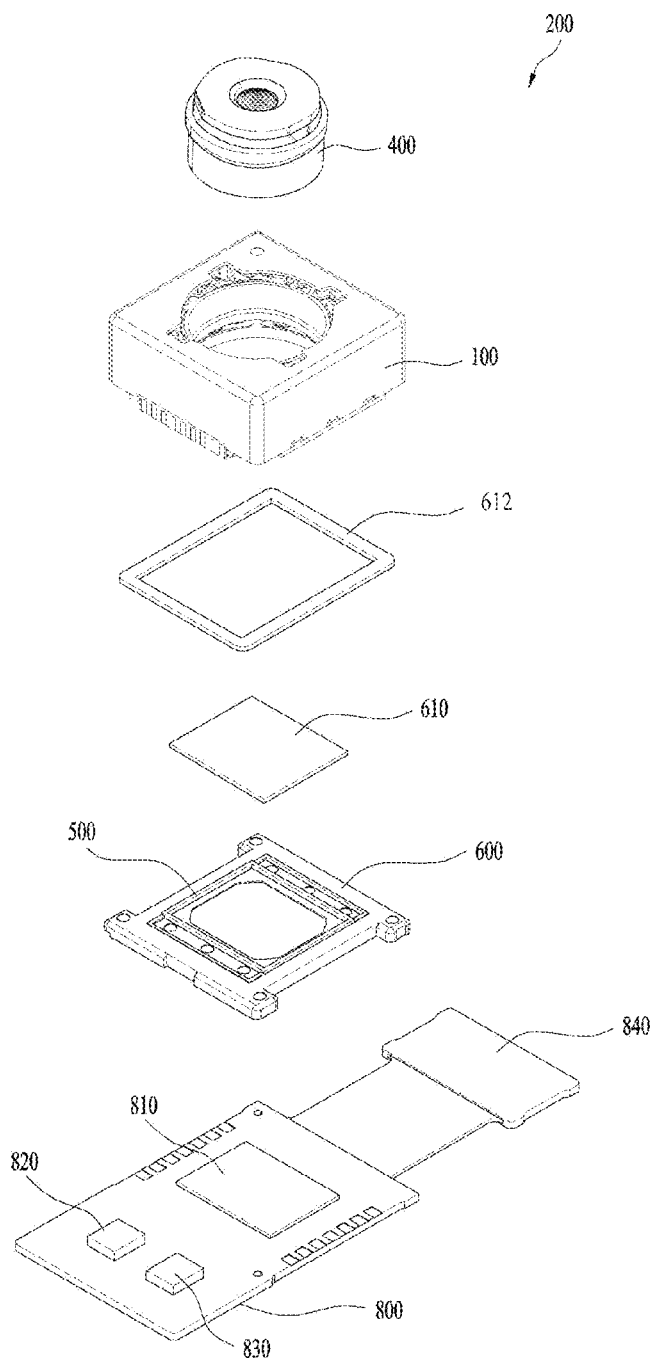
FIG. 27 is an exploded perspective view of a camera module according to an embodiment.

FIG. 27 is an exploded perspective view illustrating a camera module 200 according to an embodiment.

Referring to FIG. 27, the camera module may include a lens barrel 400, the lens moving apparatus, an adhesive member 612, a filter 610, a first holder 600, a second holder 800, an image sensor 810, a motion sensor 820, a handshake controller 830, and a connector 840.

The lens barrel 400 may be mounted in the bobbin 110 of the lens moving apparatus.

The first holder 600 may be located under the base 210 of the lens moving apparatus. The filter 610 may be mounted on the first holder 600, and the first holder 600 may have a raised portion 500 on which the filter 610 is seated.

The adhesive member 612 may couple or attach the base 210 of the lens moving apparatus to the first holder 600. In addition to the attachment function described above, the adhesive member 612 may serve to inhibit contaminants from entering the lens moving apparatus.

The adhesive member 612 may be, for example, epoxy, thermohardening adhesive, or ultraviolet hardening adhesive.

The filter 610 may serve to inhibit light within a specific frequency band, having passed through the lens barrel 400, from being introduced into the image sensor 810. The filter 610 may be an infrared-light blocking filter, without being limited thereto. Here, the filter 610 may be oriented parallel to the X-Y plane.

The region of the first holder 600 in which the filter 610 is mounted may be provided with a bore in order to allow the light that passes through the filter 610 to be introduced into the image sensor 810.

The second holder 800 may be disposed under the first holder 600, and the image sensor 810 may be mounted on the second holder 800. The light that passes through the filter 610 is introduced into the image sensor 810 so as to form an image on the image sensor 810.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor 810 may be mounted, a circuit pattern may be formed, and various devices may be coupled.

The image sensor 810 may receive an image contained in the light introduced through the lens moving apparatus, and may convert the received image into electrical signals.

The filter 610 and the image sensor 810 may be spaced apart from each other so as to be opposite to each other in the first direction.

The motion sensor 820 may be mounted on the second holder 800, and may be conductively connected to the handshake controller 830 through the circuit pattern formed on the second holder 800.

The motion sensor 820 outputs rotational angular speed information regarding the movement of the camera module 200. The motion sensor 820 may be embodied as a dual-axis or triple-axis gyro sensor or an angular speed sensor.

The handshake controller 830 may be mounted on the second holder 800, and may be conductively connected to the second position sensor 240 and the second coil 230 of the lens moving apparatus. For example, the second holder 800 may be conductively connected to the circuit board 250 of the lens moving apparatus, and the handshake controller 820 mounted on the second holder 800 may be conductively connected to the second position sensor 240 and the second coil 230 through the circuit board 250.

The handshake controller 830 may output a drive signal, which is required to allow the OIS movable unit of the lens moving apparatus to perform handshake correction, based on feedback signals provided from the second position sensor 240 of the lens moving apparatus.

The connector 840 may be conductively connected to the second holder 800, and may have a port for the electrical connection of an external component.

Figure 28:
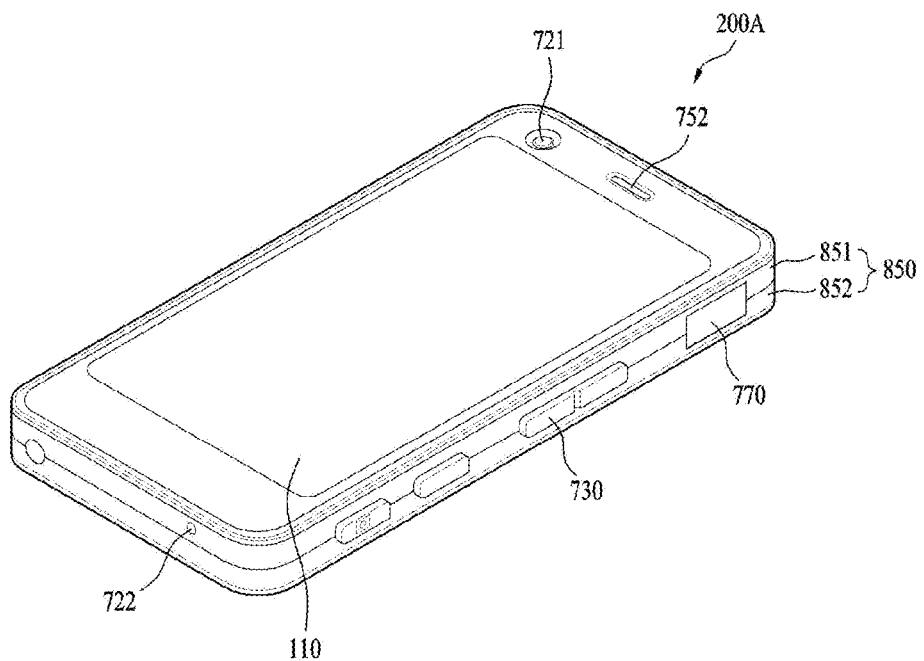
FIG. 28 is a perspective view illustrating a portable terminal according to an embodiment.
Figure 29:
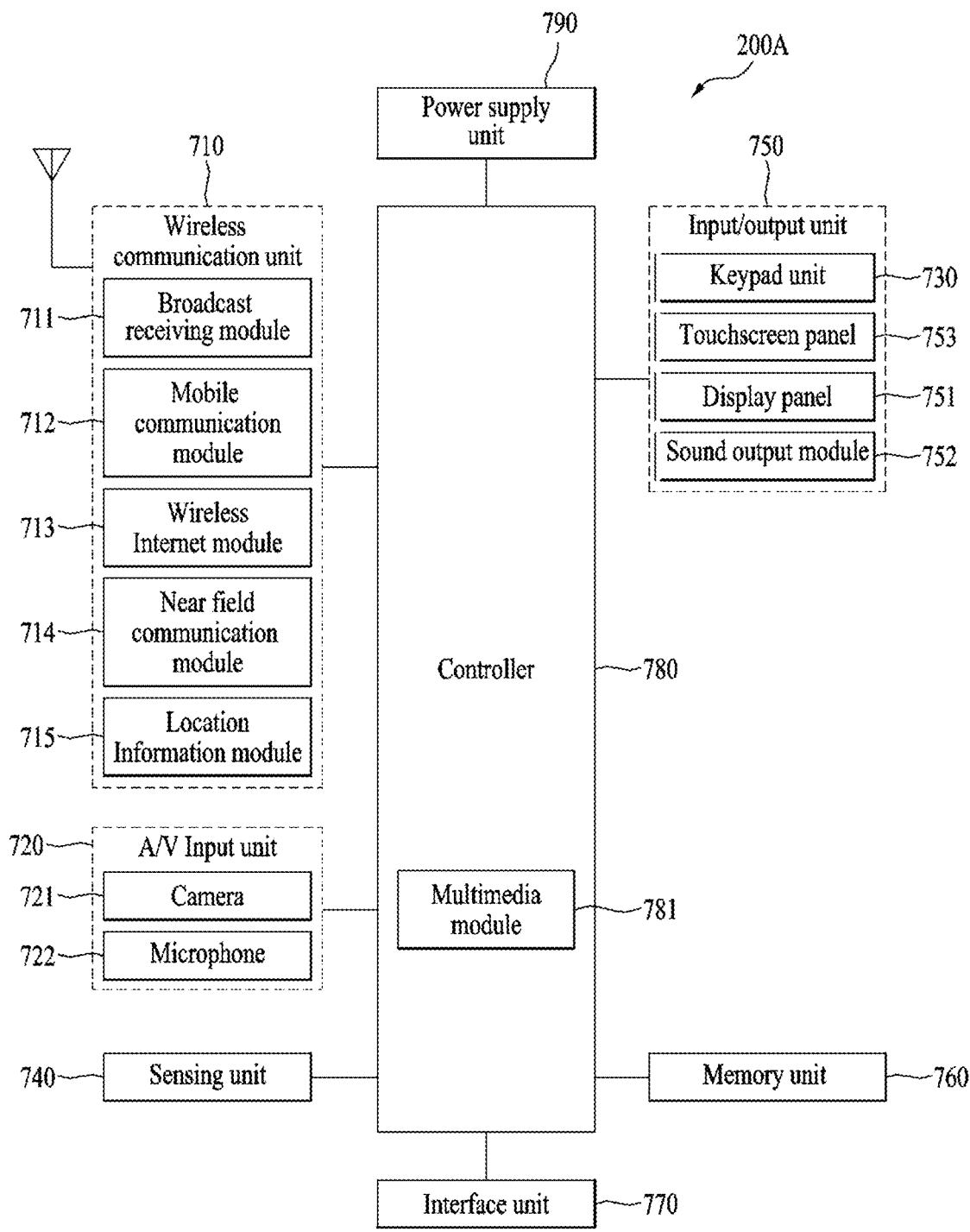
FIG. 29 is a view illustrating the configuration of the portable terminal illustrated in FIG. 28.

FIG. 28 is a perspective view illustrating a portable terminal 200A according to an embodiment. FIG. 29 is a view illustrating the configuration of the portable terminal 200A illustrated in FIG. 28.

Referring to FIGS. 28 and 29, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 28 has a bar shape, without being limited thereto, and may be any of various types such as, for example, a slide type, a folder type, a swing type, or a swivel type, in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a near field communication module 714, and a location information module 715.

The A/V input unit 720 serves to input audio signals or video signals, and may include, for example, a camera 721 and a microphone 722.

The camera 721 may be the camera 200 including the camera module 200 according to the embodiment illustrated in FIG. 27.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. For example, when the terminal 200A is a slide-type phone, the sensing unit 740 may detect whether the slide-type phone is open or closed. In addition, the sensing unit 740 serves to sense, for example, whether power is supplied from the power supply unit 790, or whether the interface unit 770 is coupled to an external component.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. For example, the display module 751 may include at least one of a liquid crystal display, a thin film transistor liquid crystal display, an organic light emitting diode display, a flexible display and a 3D display.

The sound output module 752 may output audio data received from the wireless communication unit 710 in, for example, a call signal receiving mode, a call mode, a recording mode, a voice recognition mode, or a broadcast receiving mode, or may output audio data stored in the memory unit 760.

The touchscreen panel 753 may convert variation in capacitance, caused by a user's touch on a specific region of a touchscreen, into electrical input signals.

The memory unit 760 may store programs for the processing and control of the controller 780, and may temporarily store input/output data (e.g. a phone book, messages, audio, still images, pictures, and moving images). For example, the memory unit 760 may store images captured by the camera 721, for example, pictures or moving images.

The interface unit 770 serves as a passage for connection between the terminal 200A and an external component. The interface unit 770 may receive power or data from the external component, and may transmit the same to respective constituent elements inside the terminal 200A, or may transmit data inside the terminal 200A to the external component. For example, the interface unit 770 may include, for example, a wired/wireless headset port, an external charger port, a wired/wireless data port, a memory card port, a port for the connection of a device having an identification module, an audio input/output (I/O) port, a video I/O port, and an earphone port.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be provided inside the controller 780, or may be provided separately from the controller 780.

The controller 780 may perform pattern recognition processing, by which writing or drawing, input to a touchscreen is perceived as characters and images respectively.

The power supply unit 790 may supply power required to operate the respective constituent elements upon receiving external power or internal power under the control of the controller 780.

The features, configurations, effects and the like described above in the embodiments are included in at least one embodiment, and but are not necessary to be limited to only one embodiment. In addition, the features, configuration, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

The embodiments may be applied to a lens moving device, a camera module and an optical device, which are capable of suppressing defocusing of a lens caused by variation in the ambient temperature and of easily performing calibration for auto-focusing feedback driving.

The invention claimed is:

1. A lens moving apparatus comprising:
a housing;
a bobbin disposed in the housing;
a first coil disposed on the bobbin;
a first magnet disposed on the housing;
a second magnet disposed on the housing so as to be spaced apart from the first magnet; and
a first position sensor disposed on the bobbin,
wherein a cross point between a first graph and a second graph is located in a first quadrant of an x-y coordinates system, wherein the first graph is a graph representing an output value of the first position sensor over an intensity of a magnetic field detected by the first position sensor at a first temperature, and the second graph is a graph representing an output value of the first position sensor over an intensity of a magnetic field detected by the first position sensor at a second temperature that is higher than the first temperature.

2. The lens moving apparatus according to claim 1, wherein the first temperature is 25° C., and the second temperature is higher than 25° C. but lower than 65° C.

3. The lens moving apparatus according to claim 1, wherein the first temperature is 25° C., and
the second temperature is 65° C.

4. The lens moving apparatus according to claim 1, wherein a range of output of the first position sensor in a stroke range in which the bobbin is movable is included in a first area, wherein the first area is an area including a value that is equal to or lower than a first reference value, the first reference value being an output of the first position sensor at the cross point.

5. The lens moving apparatus according to claim 4, wherein a range of output of the first position sensor in a stroke range in which the bobbin is movable is a portion of the first area located in a third quadrant.

6. The lens moving apparatus according to claim 1, wherein an output of the first position sensor in a stroke range in which the bobbin is movable is configured to range from an upper limit value to a lower limit value, and
wherein the upper limit value is the cross point and the lower limit value is located in a third quadrant of the x-y coordinates system.

7. The lens moving apparatus according to claim 1, wherein an output value of the first position sensor increases as a temperature increases.

8. The lens moving apparatus according to claim 1, wherein the cross point is spaced apart from an origin of the x-y coordinates system, an x-axis and a y-axis.

9. The lens moving apparatus according to claim 6, wherein an x-axis of the x-y coordinates system represents an intensity of a magnetic field that the first position sensor detects, and a y-axis of the x-y coordinates system represents the output of the first position sensor.

10. The lens moving apparatus according to claim 1, wherein a first portion of the housing is positioned between the second magnet and an outer circumferential surface of the housing.

11. The lens moving apparatus according to claim 10, wherein the housing comprises a magnet seat on which the second magnet is mounted, and the first portion of the housing is positioned between the second magnet and the outer circumferential surface of the housing.

12. The lens moving apparatus according to claim 10, wherein a second portion of the housing is positioned between the second magnet and an upper surface of the housing.

13. The lens moving apparatus according to claim 12, wherein a thickness of the first portion of the housing is greater than a thickness of the second portion of the housing.

14. The lens moving apparatus according to claim 10, comprising:
an upper elastic member coupled to the bobbin and the housing;
a circuit member disposed under the housing and comprising a second coil opposite to the first magnet;
a circuit board disposed under the circuit member; and
a support member conductively connected to the upper elastic member and the circuit board.

15. The lens moving apparatus according to claim 11, comprising an adhesive member disposed between the magnet seat and the second magnet.

16. The lens moving apparatus according to claim 10, wherein, when a temperature increases, the first portion of the housing expands and a distance between the second magnet and the first position sensor decreases.

17. The lens moving apparatus according to claim 1, wherein the first position sensor is disposed above the first coil so as to be spaced apart from the first coil.

18. A lens moving apparatus comprising:
a housing;
a bobbin disposed in the housing;
a first coil disposed on the bobbin;
a first magnet disposed on the housing;
a second magnet disposed on the housing so as to be spaced apart from the first magnet; and
a first position sensor disposed on the bobbin,
wherein the housing comprises a first portion positioned between the second magnet and an outer circumferential surface thereof,
wherein a cross point between a first graph and a second graph is located in a first quadrant of an x-y coordinates system, wherein the first graph is a graph representing an output value of the first position sensor over an intensity of a magnetic field detected by the first position sensor at a first temperature, and the second graph is a graph representing an output value of the first position sensor over an intensity of a magnetic field detected by the first position sensor at a second temperature that is higher than the first temperature,
wherein the output value of the first position sensor is configured to range from an upper limit value to a lower limit value, and wherein the upper limit value is the cross point and the lower limit value is located in a third quadrant of the x-y coordinates system.

19. The lens moving apparatus according to claim 1, wherein the housing comprises a second portion is positioned between the second magnet and an upper surface of the housing.

20. A camera module comprising:
a lens barrel;
the lens moving apparatus for moving the lens barrel, according to claim 1; and
an image sensor.

* * * * *